United States Patent
Yu et al.

(10) Patent No.: US 9,998,784 B2
(45) Date of Patent: Jun. 12, 2018

(54) DIGITAL DEVICE AND DATA PROCESSING METHOD IN DIGITAL DEVICE FOR CONTROLLING CONTENT WITHIN A MULTI-VIEW SCREEN

(71) Applicant: LG ELECTRONICS INC., Seoul (KR)

(72) Inventors: Hannie Yu, Seoul (KR); Taeil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/757,575

(22) Filed: Dec. 24, 2015

(65) Prior Publication Data

US 2016/0191980 A1 Jun. 30, 2016

Related U.S. Application Data

(60) Provisional application No. 62/096,549, filed on Dec. 24, 2014.

(30) Foreign Application Priority Data

Mar. 31, 2015 (KR) ........................ 10-2015-0045322

(51) Int. Cl.
G06F 3/00 (2006.01)
G06F 13/00 (2006.01)
(Continued)

(52) U.S. Cl.
CPC ..... H04N 21/4316 (2013.01); H04N 5/44591 (2013.01); H04N 5/45 (2013.01);
(Continued)

(58) Field of Classification Search
CPC .......... H04N 5/44591; H04N 21/4316; H04N 21/45; H04N 21/482; H04N 21/4858; H04N 21/8173; H04N 21/4781; H04N 21/4782

See application file for complete search history.

(56) References Cited

U.S. PATENT DOCUMENTS

| 8,107,010 B2 * | 1/2012 | Putterman .......... H04N 5/44591 |
| | | 348/563 |
| 2005/0019015 A1 * | 1/2005 | Ackley .................. G11B 27/10 |
| | | 386/201 |

(Continued)

FOREIGN PATENT DOCUMENTS

| KR | 10-2008-0039642 A | 5/2008 |
| KR | 10-2012-0131765 A | 12/2012 |

(Continued)

*Primary Examiner* — Nasser M Goodarzi
*Assistant Examiner* — Patrick A Ryan
(74) *Attorney, Agent, or Firm* — Birch, Stewart, Kolasch & Birch, LLP

(57) ABSTRACT

A disclosure is disclosed a multimedia device and a method thereof. According to an embodiment of the present invention, a display, an interface capable of receiving a first signal through a third signal, and a controller capable of controlling to: display a first application being executed on a display screen of the digital television, display a menu, overlaid on the displayed first application, including a plurality of menu items in response to the first signal requesting the menu, display a menu icon for a multi-view screen after receiving the second signal selecting a menu item among the plurality of menu items from the displayed menu, and display a second application corresponding to the selected menu item with the first application in response to the third signal, overlaid on the display screen after receiving a third signal selecting the displayed menu icon, wherein the multi-view (Continued)

screen is capable of displaying a plurality of applications together on the display screen.

20 Claims, 40 Drawing Sheets

(51) Int. Cl.
    *H04N 5/445*     (2011.01)
    *H04N 21/431*     (2011.01)
    *H04N 5/45*     (2011.01)
    *H04N 21/482*     (2011.01)
    *H04N 21/81*     (2011.01)
    *H04N 21/485*     (2011.01)
    *H04N 21/478*     (2011.01)
    *H04N 21/4782*     (2011.01)

(52) U.S. Cl.
    CPC ..... *H04N 21/4821* (2013.01); *H04N 21/4858* (2013.01); *H04N 21/818* (2013.01); *H04N 21/8173* (2013.01); *H04N 21/4781* (2013.01); *H04N 21/4782* (2013.01)

(56) References Cited

U.S. PATENT DOCUMENTS

| | | | |
|---|---|---|---|
| 2005/0190295 A1* | 9/2005 | Mizutome | H04N 5/4401 348/553 |
| 2012/0299815 A1 | 11/2012 | Kim et al. | |
| 2014/0164957 A1* | 6/2014 | Shin | G06F 3/0482 715/753 |
| 2014/0173516 A1 | 6/2014 | Hwang et al. | |
| 2014/0325436 A1 | 10/2014 | Kim et al. | |
| 2015/0007230 A1* | 1/2015 | Bulava | H04N 21/4312 725/41 |

FOREIGN PATENT DOCUMENTS

KR    10-2013-0098460 A    9/2013
KR    10-2014-0078354 A    6/2014

* cited by examiner

FIG. 14
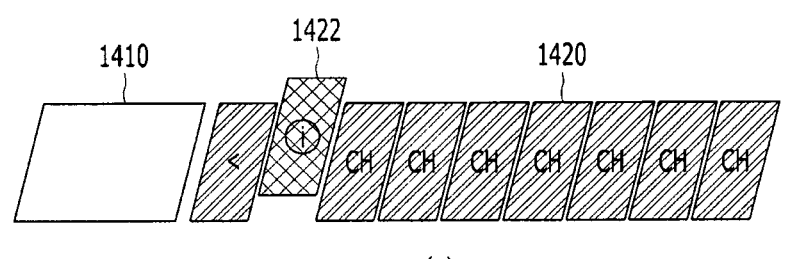
(a)
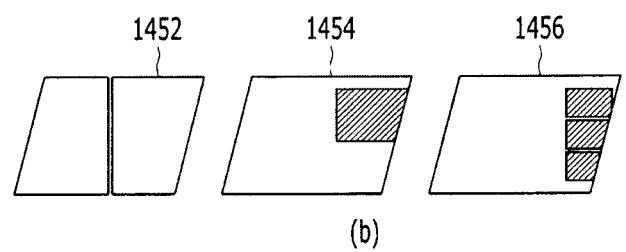
(b)

FIG. 15
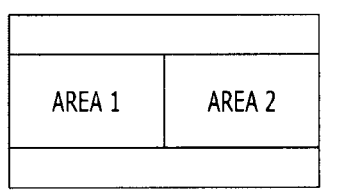
(a)
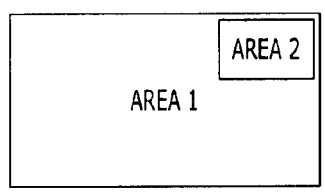
(b)
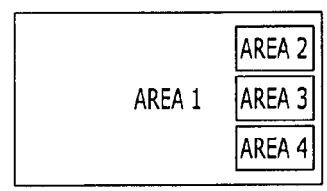
(c)
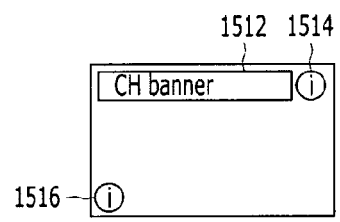
(d)

FIG. 16
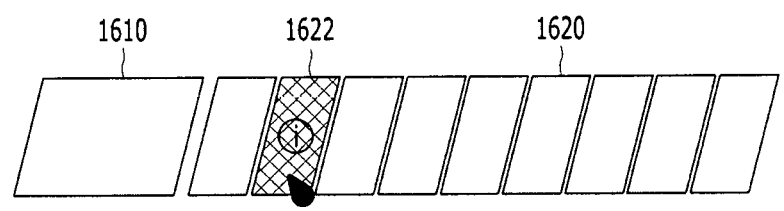
(a)
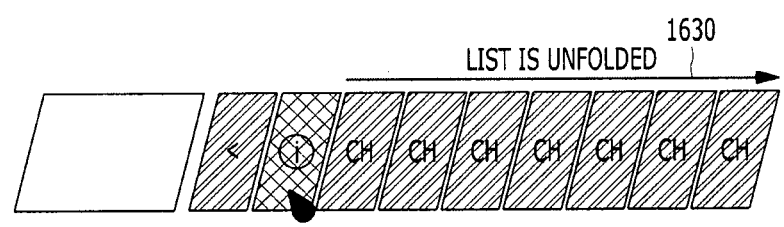
(b)
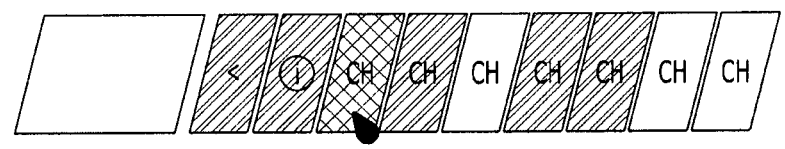
(c)

FIG. 20
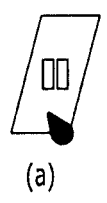
(a)
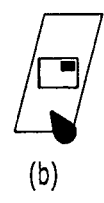
(b)
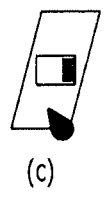
(c)
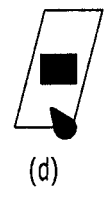
(d)

DIGITAL DEVICE AND DATA PROCESSING METHOD IN DIGITAL DEVICE FOR CONTROLLING CONTENT WITHIN A MULTI-VIEW SCREEN

This application claims the benefit of Korean Patent Application No. 10-2015-0045322, filed on Mar. 31, 2015, and U.S. Provisional Application No. 62/096,549, filed on Dec. 24, 2014, which are hereby incorporated by reference as if fully set forth herein.

BACKGROUND OF THE INVENTION

Field of the Invention

The present invention relates to a digital device and, more particularly, to data processing of multiple applications in a digital device having a Web OS platform installed therein.

Discussion of the Related Art

Not only various standing devices (e.g., a Personal Computer (PC), a television (TV), etc.) but also various mobile devices (e.g., a smartphone, a tablet PC, etc.) have been remarkably developed and come into widespread use. Although the standing devices and the mobile devices have been developed in different ways in their unique regions, their unique regions become ambiguous according to the boom of digital convergence.

In addition, with development of digital devices and environmental change, user demands for various services and applications having high performance have gradually increased.

As user demands have increased and competition between manufacturers has deepened, various functions have been provided to digital devices for differentiation. Nevertheless, in a conventional digital device, since a predetermined function may be performed only through several depths and even presence thereof is not easily recognized, only some of the functions installed in the digital device may be substantially utilized. Furthermore, recently, a remote controller, which is a control unit of a conventional digital device, has changed from a remote controller including many key buttons corresponding to functions to a remote controller including a minimum number of key buttons and using a gesture, etc. Controlling a digital device using such a remote controller causes a user to have difficulty in performing the functions of the digital device and causes user inconvenience as compared to the related art.

SUMMARY OF THE INVENTION

In order to solve the above-described problems, this specification discloses a digital device and a data processing method in the digital device.

An object of the present invention is to enable a user to easily and conveniently use a desired function through minimum depths.

Another object of the present invention is to perform processing for intuitive identification and use convenience of a user on a primary menu so as to easily and conveniently use a desired application or function.

Another object of the present invention is to configure and provide a menu such that a user can intuitively recognize and utilize multi-view menu items for a plurality of applications and functions, thereby improving product satisfaction and raising purchasing desire.

The technical problems solved by the present invention are not limited to the above technical problems and other technical problems which are not described herein will become apparent to those skilled in the art from the following description.

To achieve these objects and other advantages and in accordance with the purpose of the invention, as embodied and broadly described herein, the digital television includes a display, an interface capable of receiving a first signal through a third signal, and a controller capable of controlling to: display a first application being executed on a display screen of the digital television, display a menu, overlaid on the displayed first application, including a plurality of menu items in response to the first signal requesting the menu, display a menu icon for a multi-view screen after receiving the second signal selecting a menu item among the plurality of menu items from the displayed menu, and display a second application corresponding to the selected menu item with the first application in response to the third signal, overlaid on the display screen after receiving a third signal selecting the displayed menu icon, wherein the multi-view screen is capable of displaying a plurality of applications together on the display screen.

A method of controlling a digital television, the method comprises displaying a first application being executed on a display screen of the digital television, receiving a first signal requesting a menu, displaying the requested menu, overlaid on the displayed first application, the requested menu including a plurality of menu items, receiving a second signal selecting a menu item among the plurality of menu items from the displayed menu, displaying a menu icon for a multi-view screen, receiving a third signal selecting the displayed menu icon, and displaying a second application corresponding to the selected menu item with the first application together in response to the third signal, on the display screen, wherein the multi-view screen is capable of displaying a plurality of applications together on the display screen.

It is to be understood that both the foregoing general description and the following detailed description of the present invention are exemplary and explanatory and are intended to provide further explanation of the invention as claimed.

BRIEF DESCRIPTION OF THE DRAWINGS

FIG. 14 is a view illustrating a menu configuration related to a multi-view function according to one embodiment of the present invention;

FIG. 15 is a view showing implementation according to selection in the menu configuration of FIG. 14;

FIG. 16 is a view illustrating detailed operation of FIG. 14a;

FIG. 20 is a view illustrating change in a multi-view function menu item used in a multi-view function control process like FIG. 19;

DESCRIPTION OF SPECIFIC EMBODIMENTS

Figure 1:
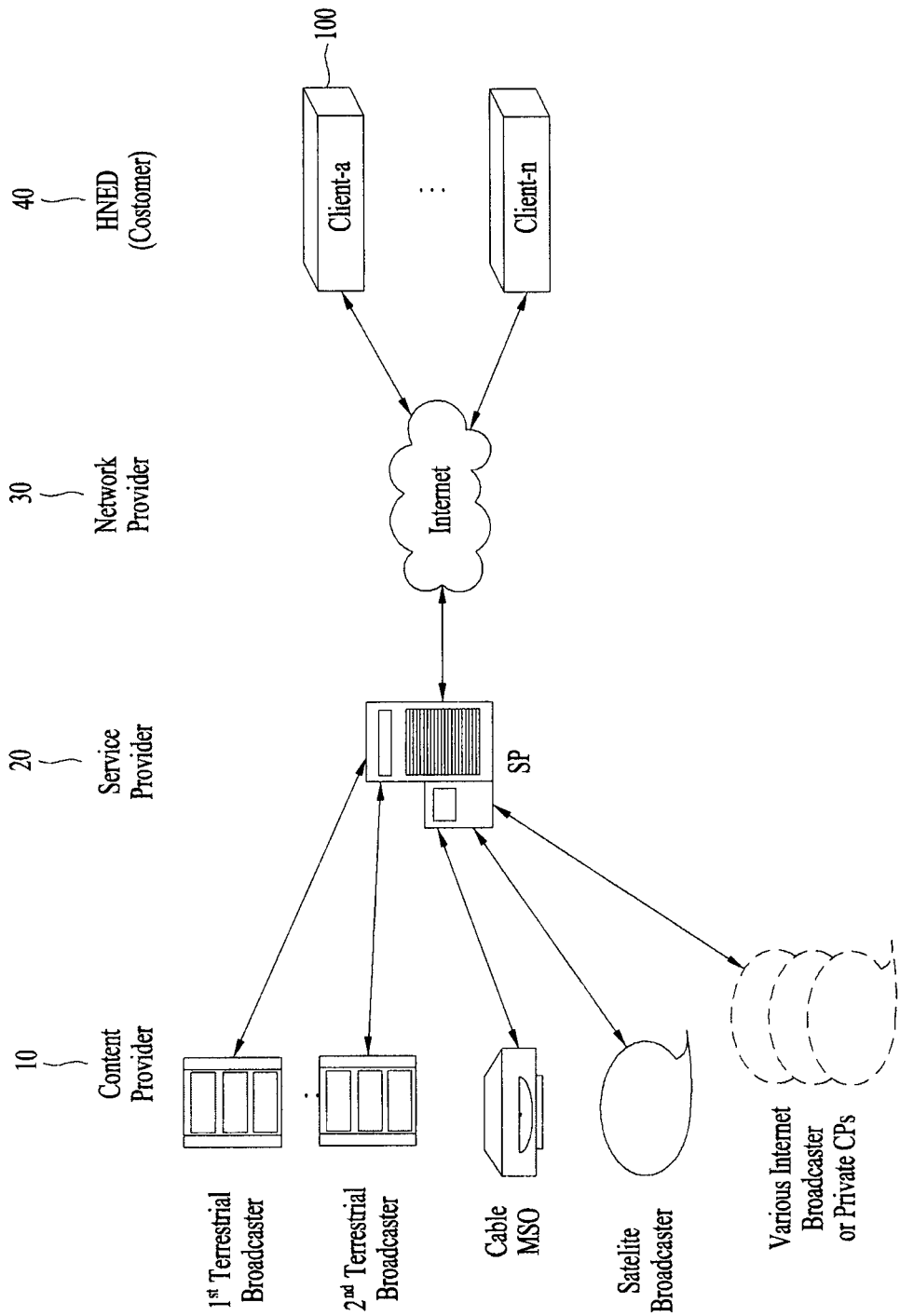
FIG. 1 is a schematic diagram illustrating a service system including a digital device according to one embodiment of the present invention.

Description will now be given in detail according to exemplary embodiments disclosed herein, with reference to the accompanying drawings. For the sake of brief description with reference to the drawings, the same or equivalent components can be provided with the same reference numbers, and description thereof will not be repeated.

In general, a suffix such as "module" and "unit" can be used to refer to elements or components. Use of such a suffix herein is merely intended to facilitate description of the specification, and the suffix itself is not intended to give any special meaning or function. Meanwhile, such an ordinal number as 'first-', 'second', 'third' and the like can have a meaning of an order. Yet, the terminologies can be used for the purpose of distinguishing one component from another component capable of being overlapped with each other. In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

A digital device according to the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 2 and mobile device is used in FIG. 3 depicting the digital device. Further, the digital device in this specification can be referred to configuration having only a panel, set-top box (STB), or a set including the entire system.

Moreover, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/ LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device.

Meanwhile, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device can further include an interface for any one of input or control means (hereinafter referred as "input means") supporting handwriting input, touch-screen, and space remote control.

Furthermore, the digital device can use standard operating system (OS), however, the digital device described in this specification and the embodiments, uses Web OS. Therefore, the digital device can perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input means or digital devices, capable of transmitting and receiving data through wired or wireless network connected to and from the digital device. For example, the external input includes High Definition Multimedia Interface (HDMI), game devices such as playstation or X-Box, smart phone, tablet PC, printing device such as pocket photo, digital devices such as smart TV and blue-ray device.

The "server" referred to as in this application, includes digital device or system capable of transmitting and receiving data to and from client, and can also be referred to as a processor. For example, the server can be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Video on Demand or streaming service, and service server providing pay services.

In this application, when application is described for the convenience of explanation, the meaning of application in the context can include services as well as applications.

In the following description, various embodiments according to the present invention are explained with reference to attached drawings.

FIG. 1 illustrates a broadcast system including a digital receiver according to an embodiment of the present invention.

Referring to FIG. 1, examples of a broadcast system comprising a digital receiver can include a content provider (CP) 10, a service provider (SP) 20, a network provider (NP) 30, and a home network end user (HNED) (Customer) 40. The HNED 40 includes a client 100, that is, a digital receiver.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Each of the CP 10, SP 20 and NP 30, or a combination thereof can be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

According to the present invention, a display, an interface capable of receiving a first signal through a third signal, and a controller capable of controlling to: display a first application being executed on a display screen of the digital television, display a menu, overlaid on the displayed first application, including a plurality of menu items in response to the first signal requesting the menu, display a menu icon for a multi-view screen after receiving the second signal selecting a menu item among the plurality of menu items from the displayed menu, and display a second application corresponding to the selected menu item with the first application in response to the third signal, overlaid on the display screen after receiving a third signal selecting the displayed menu icon, wherein the multi-view screen is capable of displaying a plurality of applications together on the display screen.

The first application and the second application include at least one of a television application capable of providing a broadcast program and an electronic program guide (EPG), a web service application, a game application, or an external input application. The first application and the second application are provided by a streaming service, stored in an internal memory or stored in an external memory. The controller is capable of controlling multi-view screens. The controller is capable of controlling the multi-view screen to provide based on a picture by picture (PBP), or one or more picture in picture (PIP) windows. The controller is capable of controlling locations of multi-view screens to interchange with each other. The controller is capable of controlling a location of each of one or more PIP windows for the multi-view screen to change in the display screen. The controller is capable of controlling to display one or more sub-menu items around the selected menu item in response to the received second signal. The controller is capable of controlling the one or more sub-menu items to be provided as a function icon. The controller is capable of controlling interchanging the second application with a third application in response to selecting a sub-menu item among the one or more sub-menu items.

Figure 2:
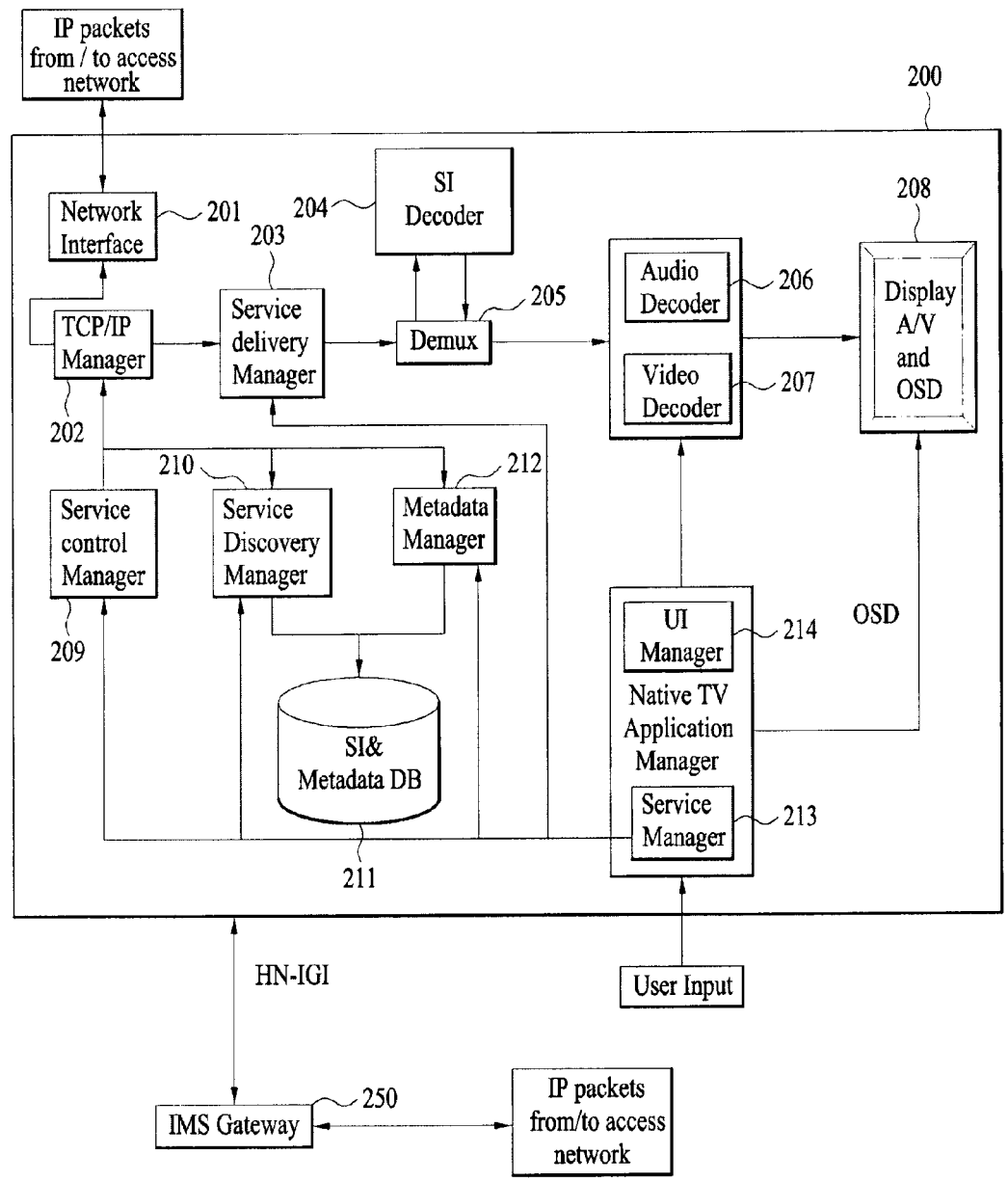
FIG. 2 is a block diagram showing a digital device according to one embodiment of the present invention.
Figure 3:
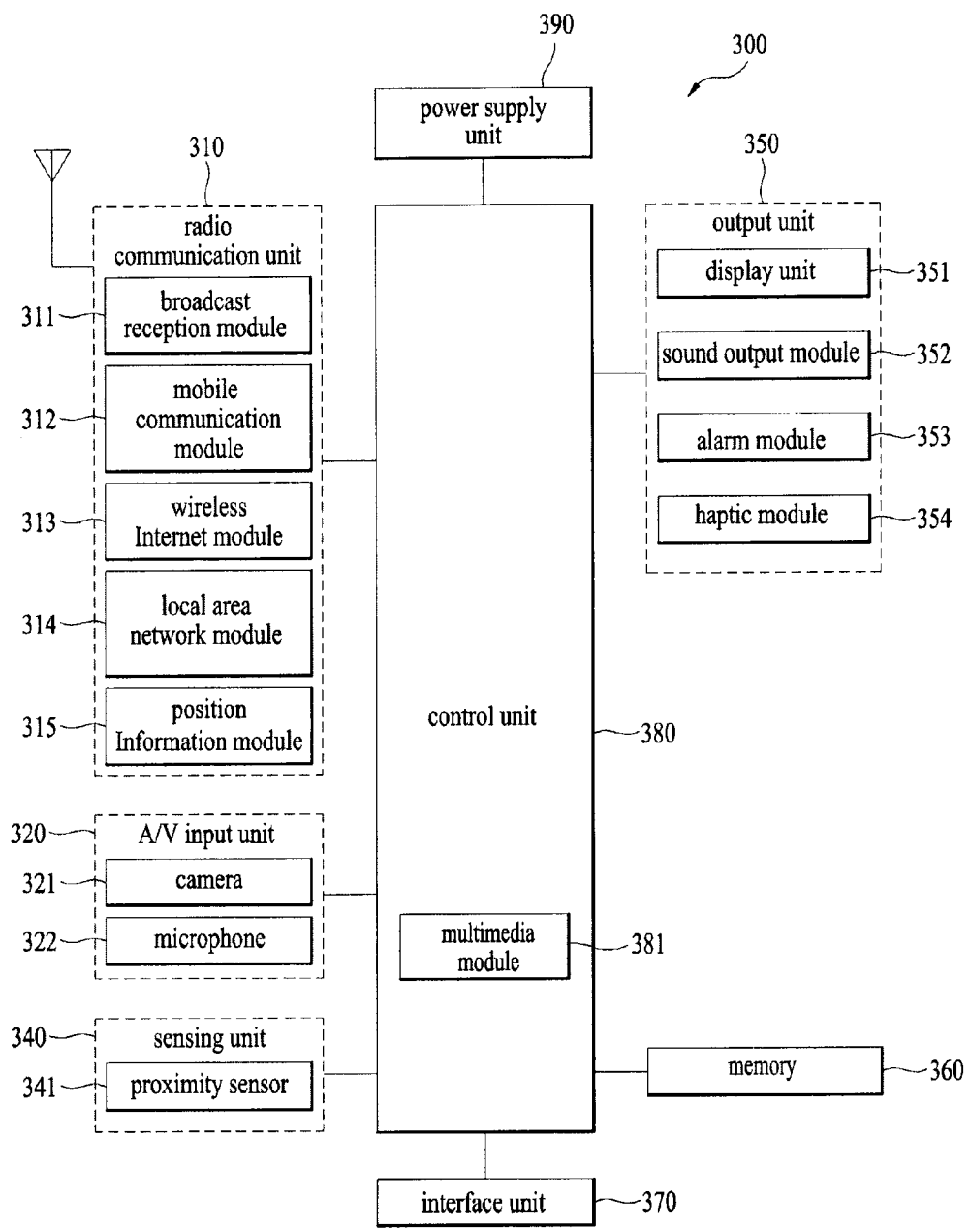
FIG. 3 is a block diagram showing the configuration of a digital device according to another embodiment of the present invention.

FIG. 2 is a schematic diagram of a digital receiver 200 according to an embodiment of the present invention. The digital receiver 200 can correspond to the client 100 shown in FIG. 1.

The digital receiver 200 can include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 can receive or transmit IP packets including service data through a network. In other words, the network interface 201 can receive IP packets including at least one of text data, image data, audio data, and video data, used for SNS, as well as services and applications from a server connected thereto through a network.

The TCP/IP manager 202 can involve delivery of IP packets transmitted to the digital receiver 200 and IP packets transmitted from the digital receiver 200, that is, packet delivery between a source and a destination. The TCP/IP manager 202 can classify received packets according to an appropriate protocol and output the classified packets to the service delivery manager 205, the service discovery manager 210, the service control manager 209, and the metadata manager 212.

The service delivery manager 203 can control classification and processing of service data. The service delivery manager 203 can control real-time streaming data, for example, using real-time protocol/real-time control protocol (RTP/RTCP). In other words, the service delivery manager 203 can parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 can demultiplex audio data, video data, SI from a received packet through packet identifier (PID) filtering and transmit the demultiplexed data to corresponding processors, that is, the audio/video decoder 206/207 and the SI decoder 204.

The SI decoder 204 can parse and/or decode SI data such as program specific information (PSI), program and system information protocol (PSIP), digital video broadcast-service information (DVB-SI), Digital Television Terrestrial Multimedia Broadcasting/Coding Mobile Multimedia Broadcasting (DTMB/CMMB), etc. The SI decoder 204 can store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively can decode audio data and video data, which are demultiplexed by the demultiplexer 205. The decoded audio data and video data can be provided to the user through the display unit 208.

The application manager can include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 can control and manage service-related managers such as the service delivery manager 203, the service discovery manager 210, the service control manager 209, and the metadata manager 212. The service manager 213 can configure a channel map and enable channel control at the request of the user on the basis of the channel map. The service manager 213 can receive service information corresponding to channel from the SI decoder 204 and set audio/video PID of a selected channel to the demultiplexer 205 so as to control the demultiplexing procedure of the demultiplexer 205.

The service discovery manager 210 can provide information required to select a service provider that provides a service. Upon receipt of a signal for selecting a channel from the service manager 213, the service discovery manager 210 discovers a service on the basis of the received signal.

The service control manager 209 can select and control a service. For example, the service control manager 209 can perform service selection and control using IGMP (Internet Group Management Protocol) or real time streaming protocol (RTSP) when the user selects a live broadcast service and using RTSP when the user selects a video on demand (VOD) service. The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data. The SI & metadata DB 211 can be implemented using a Non-Volatile RAM (NVRAM) or a Flash memory, and the like.

An IMS (IP Multimedia Subsystem) gateway 250 can include functions required to access an IMS based IPTV services.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components can be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel can include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal can be implemented as a TV broadcast signal, a radio broadcast signal, and/or a data broadcast signal, among other signals. If desired, the broadcast signal can further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312. The broadcast associated information can be implemented in various forms. For instance, broadcast associated information can include an electronic program guide (EPG) of digital multimedia broadcasting (DMB) and an electronic service guide (ESG) of digital video broadcast-handheld (DVB-H).

The broadcast receiving module 311 can be configured to receive broadcast signals transmitted from various types of broadcast systems. By non-limiting example, such broadcasting systems can include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 can be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals can carry audio, video, and data according to text/multimedia messages.

The wireless Internet module 313 supports Internet access for the mobile terminal 300. This module can be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 can be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™ to name a few.

The position-location module 315 identifies or otherwise obtains the location of the mobile terminal 100. According to one embodiment, this module can be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 can detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 can sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 can additionally or alternatively display images which are associated with these modes, the UI or the GUI.

The display module 351 can be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 can include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen can be named 'proximity touch' and an action of enabling the pointer to actually come into contact with the touch screen can named 'contact touch'. And, a position, at which the proximity touch is made to the touch screen using the pointer, can mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 can be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 can generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 can be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 can be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 can be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 can include a multimedia module 381 that provides multimedia playback. The multimedia module 381 can be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power can be internal power, external power, or combinations of internal and external power.

Various embodiments described herein can be implemented in a computer-readable medium using, for example, computer software, hardware, or some combination of computer software and hardware. For a hardware implementation, the embodiments described herein can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments can also be implemented by the controller 180.

For a software implementation, the embodiments described herein can be implemented with separate software modules, such as procedures and functions, each of which performs one or more of the functions and operations described herein. The software codes can be implemented with a software application written in any suitable programming language and can be stored in memory such as the memory 160, and executed by a controller or processor, such as the controller 380.

Figure 4:
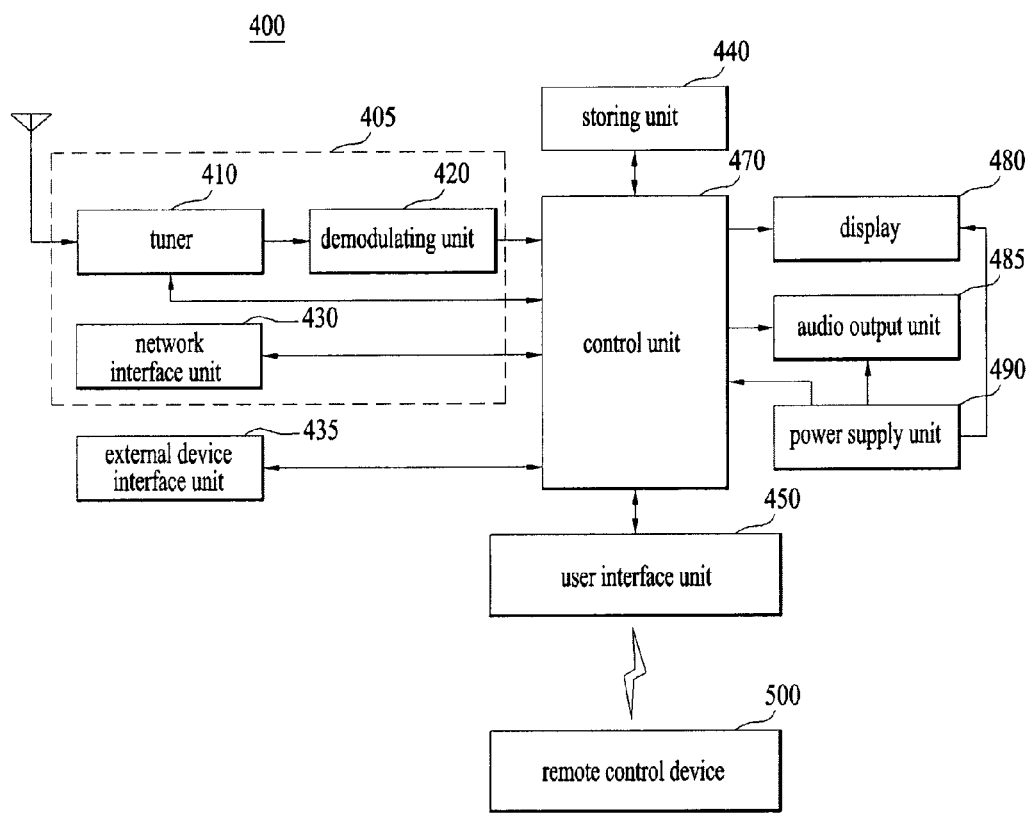
FIG. 4 is a diagram showing a digital device according to another embodiment of the present invention.

FIG. 4 illustrates a digital receiver according to another embodiment of the present invention.

Referring to FIG. 4, an exemplary digital receiver 400 according to the present invention can include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 can include at least one of one or more tuner 410, a demodulator 420, and a network interface 430.

The broadcast receiving unit 405 can include the tuner 410 and the demodulator 420 without the network interface 430, or can include the network interface 430 without the tuner 410 and the demodulator 420. The broadcast receiving unit 405 can include a multiplexer (not shown) to multiplex a signal, which is subjected to the tuner 410 and demodulated by the demodulator 420, and a signal received through the network interface 40.

In addition, the broadcast receiving unit 405 can include a demultiplexer (not shown) and demultiplex a multiplexed signal, a demodulated signal, or a signal received through the network interface 430.

The tuner 410 can receive a radio frequency (RF) broadcast signal by tuning to a channel selected by the user from among RF broadcast signals received through an antenna or all previously stored channels.

The demodulator 420 can receive a digital IF (Intermediate Frequency) signal (DIF) converted by the tuner 410 and demodulate the DIF signal.

A stream signal output from the demodulator 420 can be input to the controller 470.

The controller 470 can control demultiplexing, audio/video signal processing, etc. Furthermore, the controller 470 can control output of an image through the display unit 480 and output of audio through the audio output unit 485.

The external device interface 435 can provide an environment for interfacing external devices with the digital receiver 400. To implement this, the external device interface 435 can include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit can include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 can provide an interface for connecting the digital receiver 400 to wired/wireless networks.

Using the network interface 430, the digital receiver can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 can store programs for signal processing and control and store a processed video, audio or data signal.

In addition, the storage unit 440 can execute a function of temporarily storing a video, audio or data signal input from the external device interface 435 or the network interface 430.

The storage unit 440 can store information about a predetermined broadcast channel through a channel memory function.

The storage unit 440 can store an application or a list of applications input from the external device interface 435 or the network interface 430.

The storage unit 440 can store various platforms which will be described later.

The storage unit 440 can include storage media of one or more types, such as a flash memory type, a hard disk type, a multimedia card micro type, a card type memory (e.g., SD or XD memory), RAM, EEPROM, etc.

The digital receiver 400 can reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 can be included in the controller 470.

The user input interface 450 can transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown).

Here, the sensing unit (not shown) can include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 can include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 can control the tuner 410 to receive a signal of a channel selected in response to a predetermined channel selection command received through the user input interface 450. In addition, the controller 470 can process a video, audio or data signal corresponding to the selected channel. The controller 470 can control information on a channel selected by the user to be output with a processed video or audio signal through the display unit 480 or the audio output unit 485.

Alternatively, the controller 470 can control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content can be content stored in the digital receiver 400, received broadcast content, or content input from an external device. The content can include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 can further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 can convert a video signal, a data signal, and an OSD signal processed by the controller 470 and a video signal and a data signal received from the external device interface 435 into RGB signals to generate driving signals.

The display unit 480 can be a PDP, an LCD, an OLED, a flexible display, a 3D display or the like.

The display unit 480 can be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 can further include the sensing unit (not shown) for sensing a gesture of the user, which includes at least one of a touch sensor, a voice sensor, a position sensor, and an action sensor, as described above.

A signal sensed by the sensing unit (not shown) can be delivered to the controller 470 through the user input interface 450.

The digital receiver 400 can further include the photographing unit (not shown) for photographing the user. Image information acquired by the photographing unit (not shown) can be supplied to the controller 470.

The controller 470 can sense a gesture of the user from an image captured by the photographing unit (not shown) or a signal sensed by the sensing unit (not shown), or by combining the image and the signal.

The power supply unit 490 can supply power to the digital receiver 400.

Particularly, the power supply unit 490 can supply power to the controller 470 which can be implemented as a system-on-chip (SoC), the display unit 480 for displaying images, and the audio output unit 485 for audio output.

The remote controller 500 can transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 can be omitted or a component (not shown in FIG. 2) can be added as required. The digital receiver according to the present invention cannot include the tuner and the demodulator, differently from the digital receivers shown in FIGS. 2 and 4, and can receive content through the network interface or the external device interface and reproduce the content.

Figure 5:
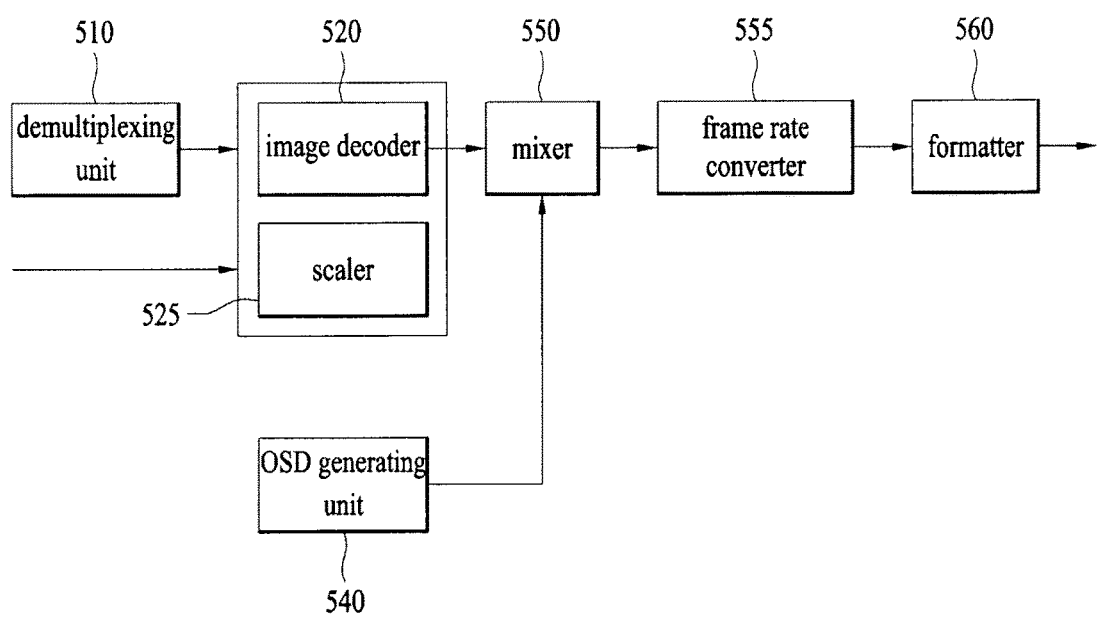
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 through 4.

The digital receiver according to the present invention can include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor 420 can process a demultiplexed image signal using a video decoder 525 and a scaler 535.

The video decoder 525 can decode the demultiplexed image signal and the scaler 535 can scale the resolution of the decoded image signal such that the image signal can be displayed.

The image signal decoded by the image processor 520 can be input to the mixer 550.

The OSD generator 540 can generate OSD data automatically or according to user input. For example, the OSD generator 540 can generate data to be displayed on the screen of an output unit in the form of an image or text on the basis of a control signal of a user input interface.

OSD data generated by the OSD generator 540 can include various data such as a user interface image of the digital receiver, various menu screens, widget, icons, and information on ratings. The OSD generator 540 can generate a caption of a broadcast image or data for displaying EPG based broadcast information.

The mixer 550 can mix the OSD data generated by the OSD generator 540 and the image signal processed by the image processor 520. The mixer 550 can provide the mixed signal to the 3D formatter 560. By mixing the decoded image signal and the OSD data, OSD can be overlaid on a broadcast image or external input image.

The frame rate converter (FRC) 555 can convert a frame rate of input video. For example, the frame rate converter 555 can convert the frame rate of an input 60 Hz video to a frame rate of 120 Hz or 240 Hz, according to an output frequency of the output unit. The frame rate converter 555 can be bypassed when frame conversion is not executed.

The 3D formatter 560 can change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) can audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal can be EPG information including broadcast information such as the start time and end time (or duration) of a broadcast program which is broadcast through each channel.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital receiver is an example of image signal processors which process an image stored therein or an input image. Other examples of the image signal processors can include a set-top box (STB) which does not include the display unit 380 and the audio output unit 485 shown in FIG. 4, a DVD player, a Blu-ray player, a game device, a computer, etc.

Figure 6:
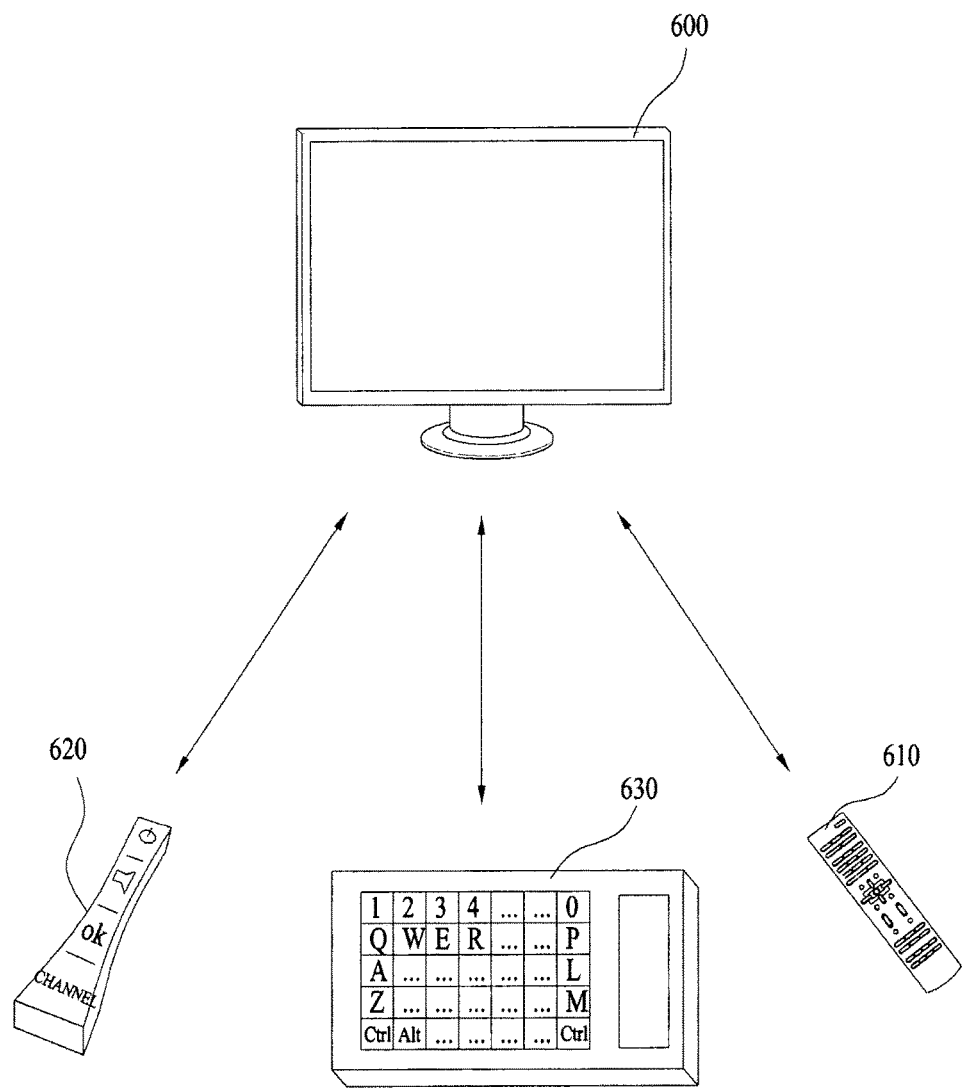
FIG. 6 is a diagram showing an input unit connected to each of the digital devices of FIGS. 2 to 4 according to one embodiment of the present invention.

FIG. 6 illustrates remote controllers of a digital receiver according to an embodiment of the present invention.

To execute various operations for implementing the present invention according to embodiments, various user interface devices (UIDs) which can communicate with a digital receiver 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610.

The remote controllers can use various communication protocols such as Bluetooth, RFID, IrDA, UWB, ZigBee, DLNA, etc.

The magic remote controller 620 can include a gyro sensor mounted therein to sense vibration of a user's hand or rotation.

That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

The digital device described in the present specification uses Web OS as a platform. Hereinafter, a Web OS based process or algorithm can be performed by the controller of the above-described digital device.

The controller includes the controllers of FIGS. 2 to 5 and has wide concepts. Accordingly, hereinafter, a component for processing Web OS based services, applications, content, etc., including software, firmware or hardware in a digital device is referred to a controller.

Such a Web OS based platform can improve development independency and functional extensibility by integrating services, applications, etc. based on a Luna-service bus, for example, and increase application development productivity based on web application framework. In addition, system resources, etc. can be efficiently used via a Web OS process and resource management to support multitasking.

A Web OS platform described in the present specification can be available not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
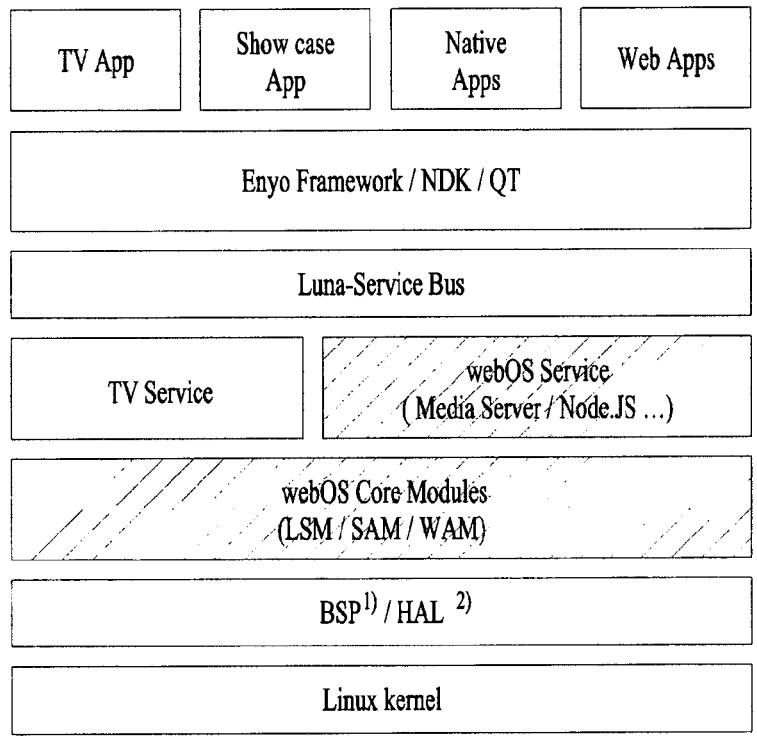
FIG. 7 is a diagram illustrating Web OS architecture according to one embodiment of the present invention.

FIG. 7 is a diagram illustrating Web OS architecture according to one embodiment of the present invention.

The architecture of a Web OS platform will now be described with reference to FIG. 7.

The platform can be largely divided into a kernel, a system library based Web OS core platform, an application, a service, etc.

The architecture of the Web OS platform has a layered structure. OSs are provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided.

Some layers of the above-described Web OS layered structure can be omitted and a plurality of layers can be combined to one layer and one layer can be divided into a plurality of layers.

The Web OS core module layer can include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM can control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application can use a service via a Luna-service bus. A service can be newly registered via a bus and the application can detect and use a desired service.

The service layer can include services having various service levels, such as a TV service, a Web OS service, etc. The Web OS service can include a media server, Node.JS, etc. and, in particular, the Node.JS service supports JavaScript, for example.

The Web OS service can be communicated to a Linux process implementing function logic via a bus. This Web OS service is largely divided into four parts, migrates from a TV process and an existing TV to a Web OS, is developed as services which differ between manufacturers, Web OS common services and JavaScripts, and is composed of the Node.js service used via Node.js.

The application layer can include all applications supportable by a digital device, such as a TV application, a showcase application, a native application, a web application, etc.

Applications on the Web OS can be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or can be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application can be used to develop applications requiring high performance.

The QML application is a Qt based native application and includes basic applications provided along with the Web OS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
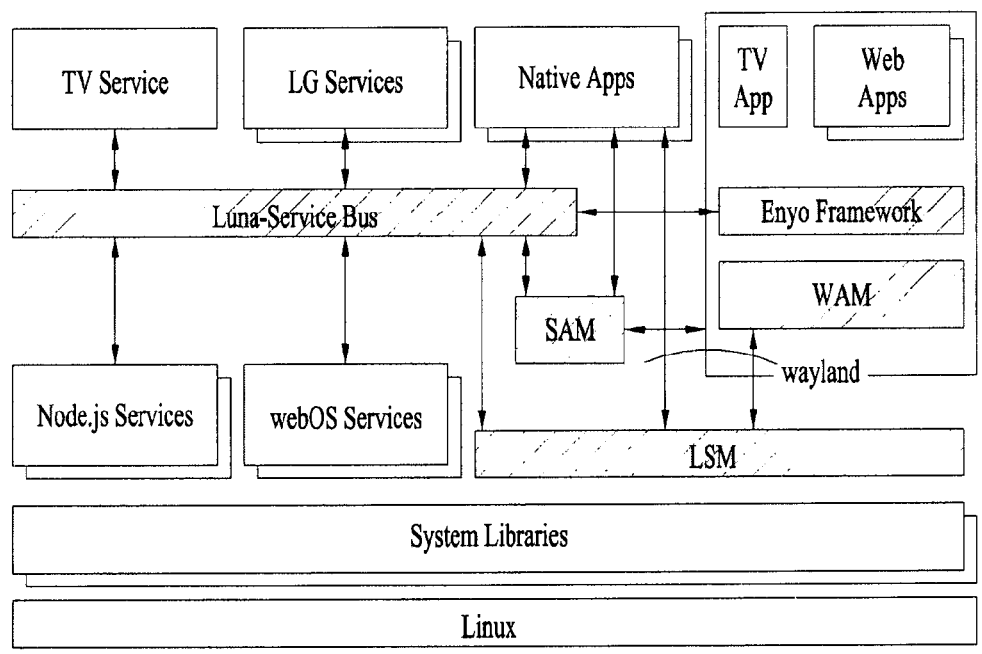
FIG. 8 is a diagram illustrating architecture of a Web OS device according to one embodiment of the present invention.

FIG. 8 is a diagram illustrating the architecture of a Web OS device according to one embodiment of the present invention.

FIG. 8 is a block diagram based on a runtime of a Web OS device and is described with reference to the layered structure of FIG. 7.

Hereinafter, a description will be given with reference to FIGS. 7 and 8.

Referring to FIG. 8, services, applications and Web OS core modules are included on a system OS (Linux) and system libraries and communication therebetween can be performed via a Luna-service bus.

Node.js services based on HTML5 such as e-mail, contact or calendar, CSS, JavaScript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, now on, notification, search, auto content recognition (ACR), contents list browser (CBOX), wfdd, DMR, remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX can manage metadata and lists of content of external devices such as USB drivers, DLNA devices or Cloud servers connected to a TV. The CBOX can output content listing of various content containers such as USB, DMS, DVR, Cloud server, etc. as an integrated view. The CBOX can display various types of content listings such as pictures, music or video and manage metadata thereof. The CBOX can output content of an attached storage in real time. For example, if a storage device such as a USB is plugged in, the CBOX should immediately output a content list of the storage device. At this time, a standardized method for processing the content listing can be defined. The CBOX can accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and can provide a window management mechanism for 21:9 and a multi-window.

The LSM supports implementation of a system UI based on a QML and improves development productivity. QML UX can easily configure a view using a screen layout and UI components based on MVC and easily develop code for processing user input. An interface between the QML and the Web OS component is achieved via a QML extensibility plug-in and graphic operation of an application can be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. can be included as an input manager.

The LSM supports multiple window models and can be simultaneously executed in all applications as a system UI. The LSM can support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, auto content recognition (ACR), etc.

Figure 9:
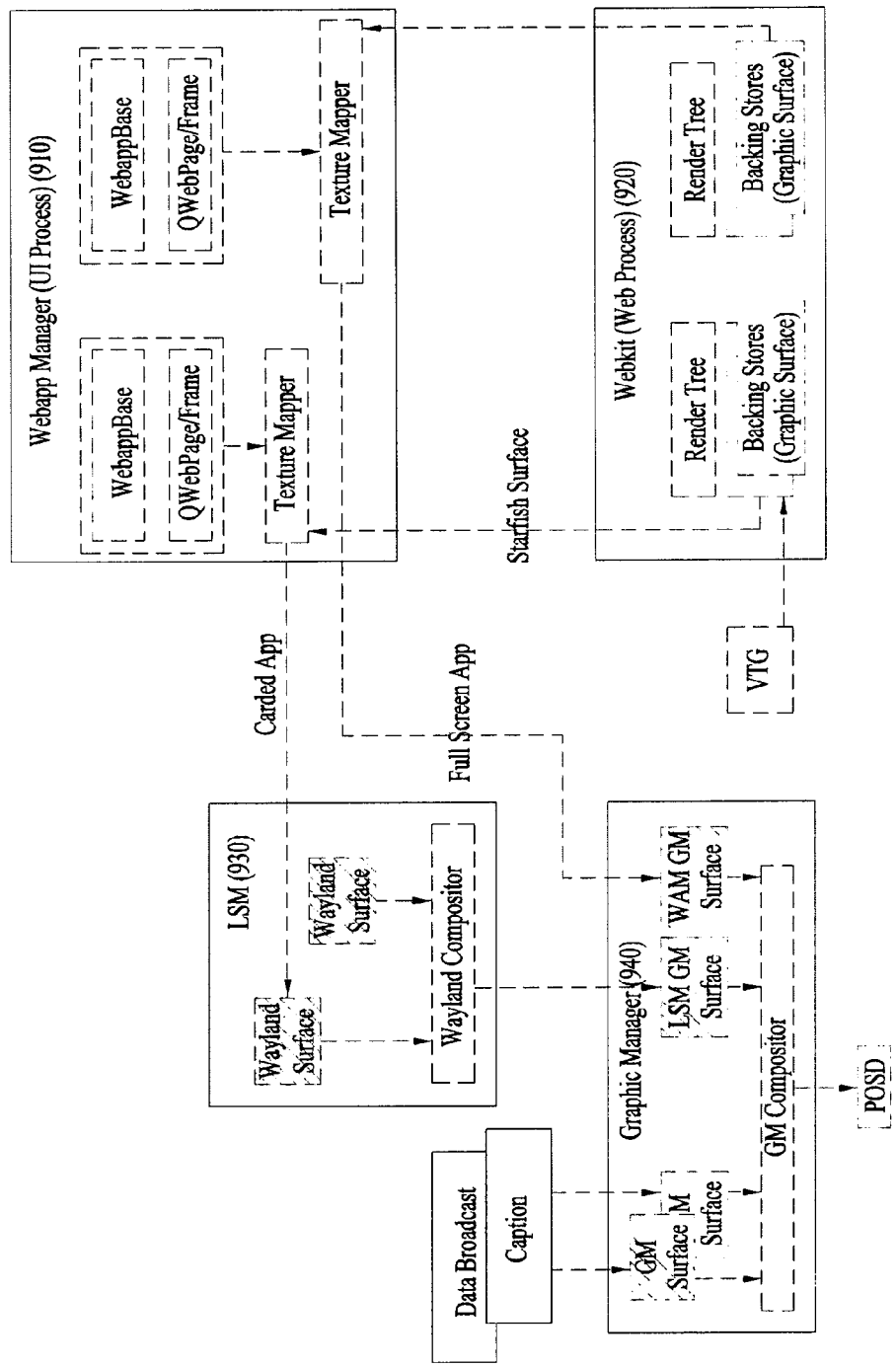
FIG. 9 is a diagram illustrating a graphic composition flow in a Web OS device according to one embodiment of the present invention.

FIG. 9 is a diagram illustrating a graphic composition flow in a Web OS device according to one embodiment of the present invention.

Referring to FIG. 9, graphic composition processing can be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a full-screen application. The web application manager 910 receives an application generated by the WebKit 920 in order to share a graphic processing unit (GPU) memory for graphic management between the UI process and the web process and delivers the application to the LSM 930 if the application is not a full-screen application. If the application is a full-screen application, the LSM 930 can bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The full-screen application is directly delivered to the graphics manager 940 without passing through the LSM 930 as described above and is processed in the graphics manager compositor via the WAM GM surface.

The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
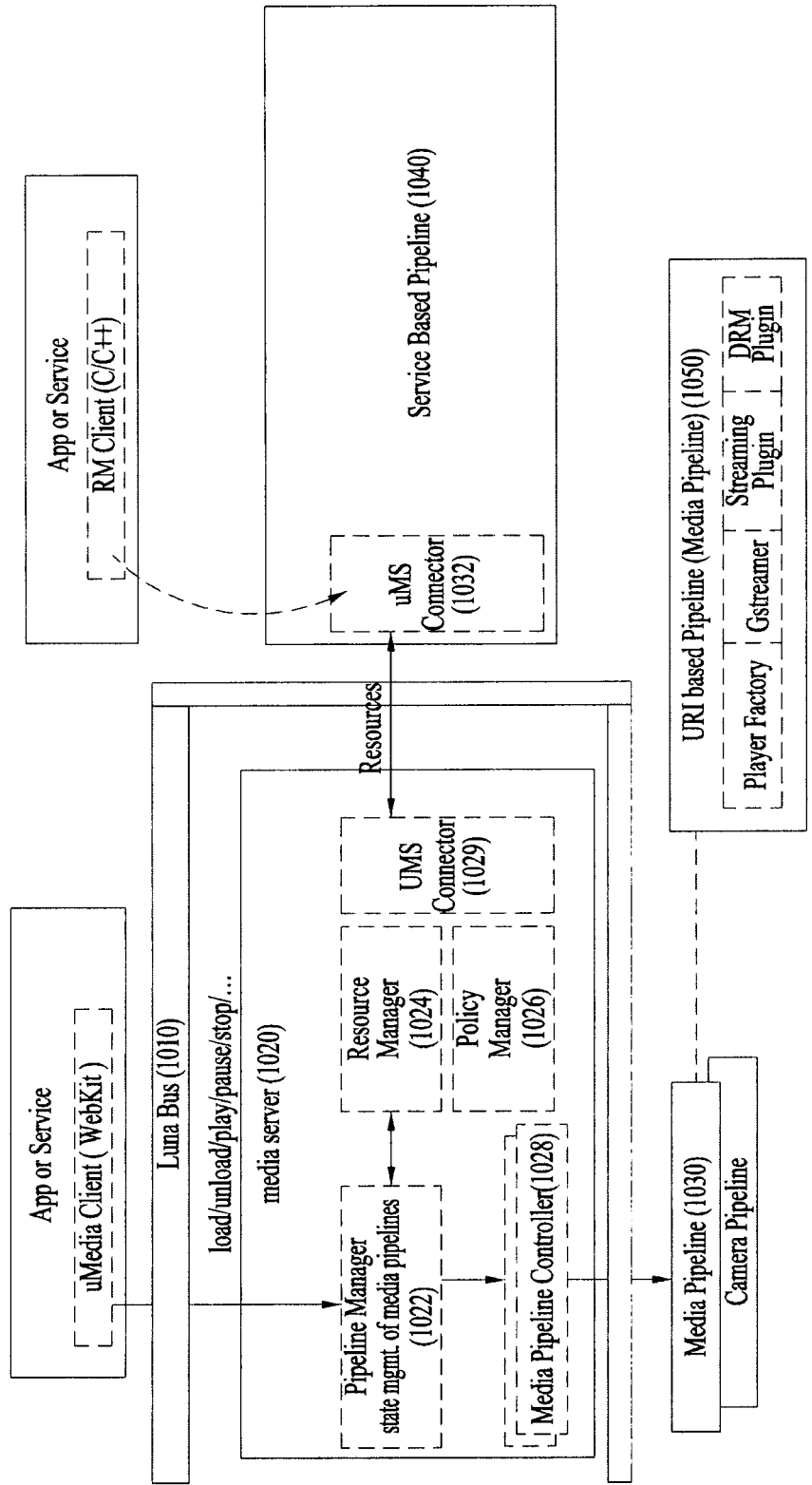
FIG. 10 is a diagram illustrating a media server according to one embodiment of the present invention.
Figure 11:
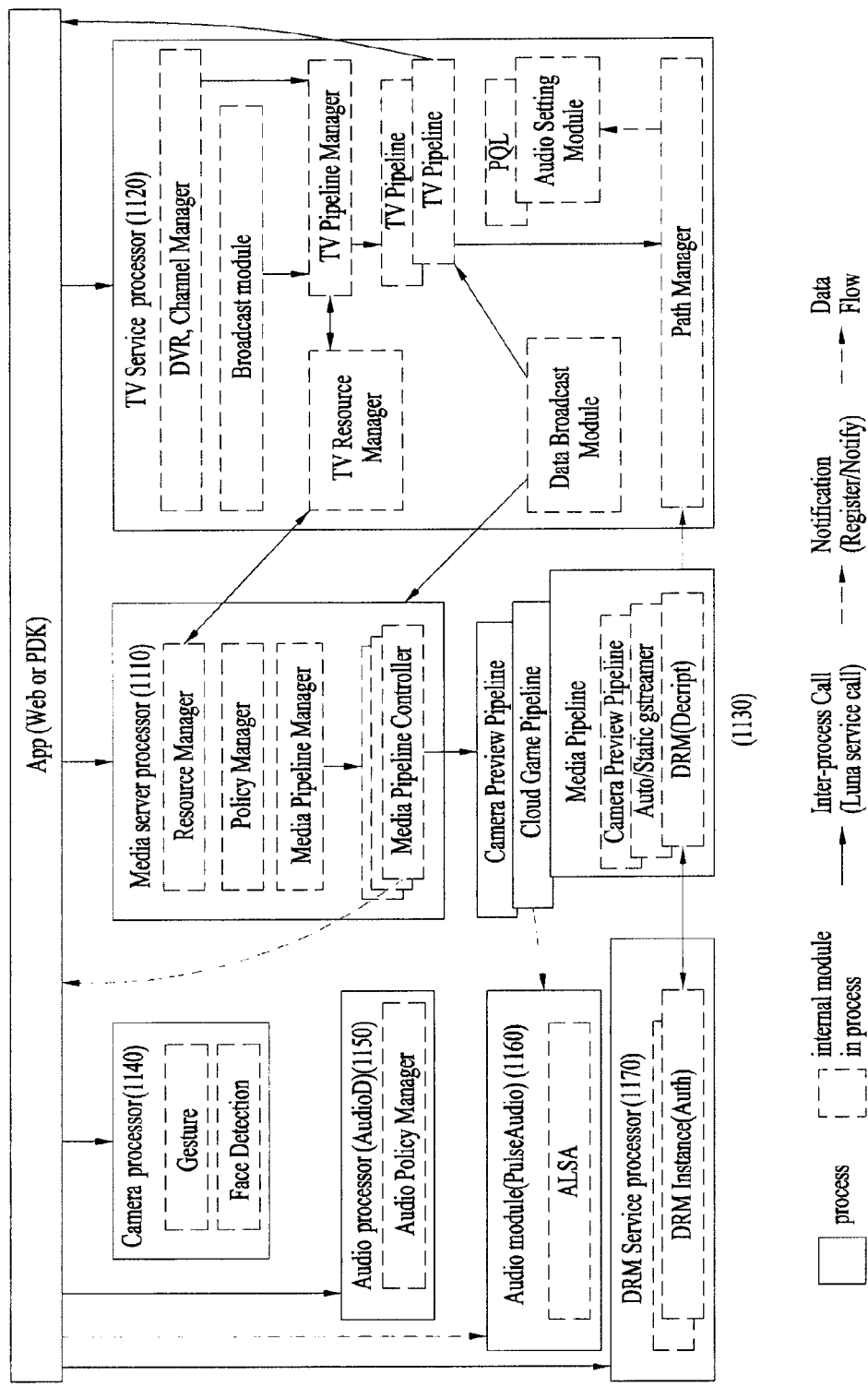
FIG. 11 is a block diagram showing the configuration of a media server according to one embodiment of the present invention.
Figure 12:
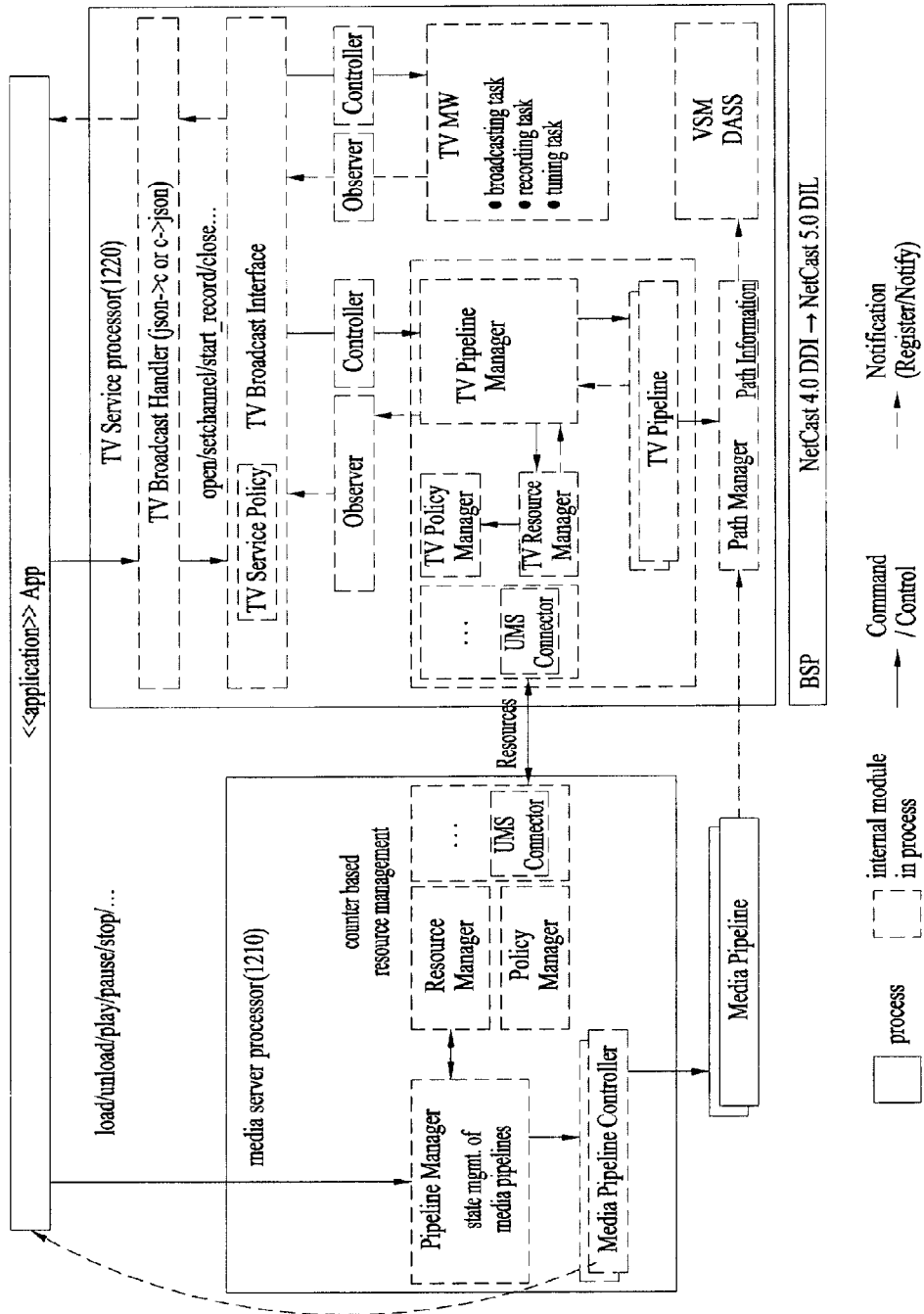
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server can efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server can make system stability robust, and can remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions can be changed according to media type, etc.

The media server can have extensibility and can add a new type of pipeline without influencing an existing implementation method. For example, the media server can accommodate a camera pipeline, a video conference (Skype) pipeline, a third-party pipeline, etc.

The media server can process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server can control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server can have identifiers (IDs) for all operations related to playback. For example, the media server can send a command to a specific pipeline based on the ID. The media server can send respective commands to pipelines for playback of two or more media.

The media server is responsible for playing back a HTML5 standard media.

The media server performs a service process of a TV pipeline according to a TV restructuralization range. The media server can be designed and implemented regardless of the TV restructuralization range. If the separate service process of the TV is not performed, the TV can be wholly re-executed when errors occurs in a specific task.

The media server is also referred to as MS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server can manage pipeline controller resources.

The media server supports extensibility, reliability, efficient resource usage, etc., for example.

In other words, the MS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server can manage and control generation, deletion, use of a pipeline for resource management.

The pipeline can be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and can exchange data with the media server 1020 or the pipeline via the clients.

The clients include a Media client (WebKit) for connection with the media server 1020 and a resource manager (RM) client (C/C++), for example.

The application including the Media client is connected to the media server 1020 as described above. More specifically, the Media client corresponds to the below-described video object, for example, and uses the media server 1020 for video operation by a request, etc.

The video operation relates to a video status and can include all status data related to the video operation, such as loading, unloading, play (playback or reproduction), pause, stop, etc. Such video operations or statuses can be processed by generating individual pipelines. Accordingly, the Media client transmits status data related to the video operation to the pipeline manager 1022 in the media server.

The media server 1022 acquires information about resources of the current device via data communication with the resource manager 1024 and requests assignment of resources corresponding to the status data of the Media client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment can be appropriately performed according to priority comparison of the policy manager 1026.

The pipeline manager 1022 requests to generate a pipeline for operation according to the request of the Media client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop can be generated. The pipeline includes pipelines for HTML5, web CP, Smarthshare playback, thumbnail extraction, NDK, cinema, multimedia and hypermedia information coding experts group (MHEG), etc.

The pipeline can include a service-based pipeline and a URI based pipeline (media pipeline), for example.

Referring to FIG. 10, the application or service including the RM client cannot be directly connected to the media server 1020, because the application or service can directly process a media. In other words, if the application or service directly processes a media, the media server cannot be used. At this time, for pipeline generation and usage, resource management is necessary and, at this time, a MS connector is used. When a resource management request for direct media processing of the application or service is received, the MS connector communicates with the media server 1020 including the resource manager 1024. The media server 1020 also includes a MS connector.

Accordingly, the application or service can cope with the request of the RM client via resource management of the resource manager 1024 via the MS connector. The RM client can process services such as native CP, TV service, second screen, flash player, You Tube media source extensions (MSE), cloud game, Skype, etc. In this case, as described above, the resource manager 1024 can manage resources via appropriate data communication with the policy manager 1026 if necessary for resource management.

The URI based pipeline does not directly process the media unlike the above-RM client but processes the media via the media server 1020. The URI based pipeline can include player factory, Gstreamer, streaming plug-in, digital rights management (DRM) plug-in pipelines.

An interface method between the application and the media services is as follows.

An interface method using a service in a web application can be used. In this method, a Luna call method using a palm service bridge (PSB) and a method of using Cordova can be used, in which a display is extended to a video tag. In addition, a method of using HTML5 standard related to a video tag or media element can be used.

A method of using a service in PDK can be used.

Alternatively, a method of using in existing CP can be used. For backward compatibility, plug-in of an existing platform can be extended and used based on Luna.

Lastly, an interface method using a non-Web OS can be used. In this case, a Luna bus can be directly called to perform interfacing.

Seamless change is processed by a separate module (e.g., TVWIN) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 can generate a pipeline via a media server processor 1110 with respect to data which requires use of a pipeline according to user selection or automatically and process the data.

Alternatively, if the application includes audio data, the audio can be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 can include an audio policy manager to determine processing of the audio data. The processed audio data is processed by the audio module 1160. The application or a pipeline related thereto can notify the audio module 1160 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1170 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 can include a TV broadcast handler, a TV broadcast interface, a service processor, TV middleware (MW), a path manager and a BSP (NetCast). The service processor can mean a module including a TV pipeline manager, a TV resource manager, a TV policy manager, a USM connector, etc., for example.

In the present specification, the TV service processor can have the configuration of FIG. 11 or FIG. 12 or a combination thereof. Some components can be omitted or other components (not shown) can be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface can transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager can be controlled by the TV policy manager, in order to request a resource assignment status for a TV service according to a request for generation of a TV pipeline of the TV pipeline manager, and can perform data communication with the media server processor 1110/1210 via a MS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager can be notified that assignment of all resources is completed. At this time, the resource manager in the media server processor can remove a predetermined TV pipeline according to a predetermined criterion or priority of TV pipelines already assigned for the TV service along with notification and request generation of a TV pipeline for the requested TV service. Alternatively, the TV resource manager can appropriately remove a TV pipeline or can add or newly establish a TV pipeline according to a status report of the resource manager in the media server processor 1110/1210.

The BSP supports backward compatibility with an existing digital device.

The generated TV pipelines can appropriately operate under control of the path manager in the processing procedure. The path manager can determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. can be generated. The media pipeline can include streaming protocol, auto/static gstreamer, DRM, etc. and the processing flow thereof can be determined under control of the path manager. For a detailed description of the processing procedure of the media server processor 1110/1210, refer to the description of FIG. 10 and a repeated description will be omitted. In the present specification, the resource manager in the media server processor 1110/1210 can perform resource management to a counter base, for example.

Hereinafter, a menu UI for a multi-view screen or function for simultaneously processing a plurality of applications or functions and scenarios for performing the same according to the present invention will be described in greater detail.

In addition, in this specification, application data includes all data related to the application, such as data necessary to execute an application and an application execution screen, and the detailed meaning thereof is determined according to drawings and contexts. The present invention will be described using application data without distinction, for convenience.

Figure 13:
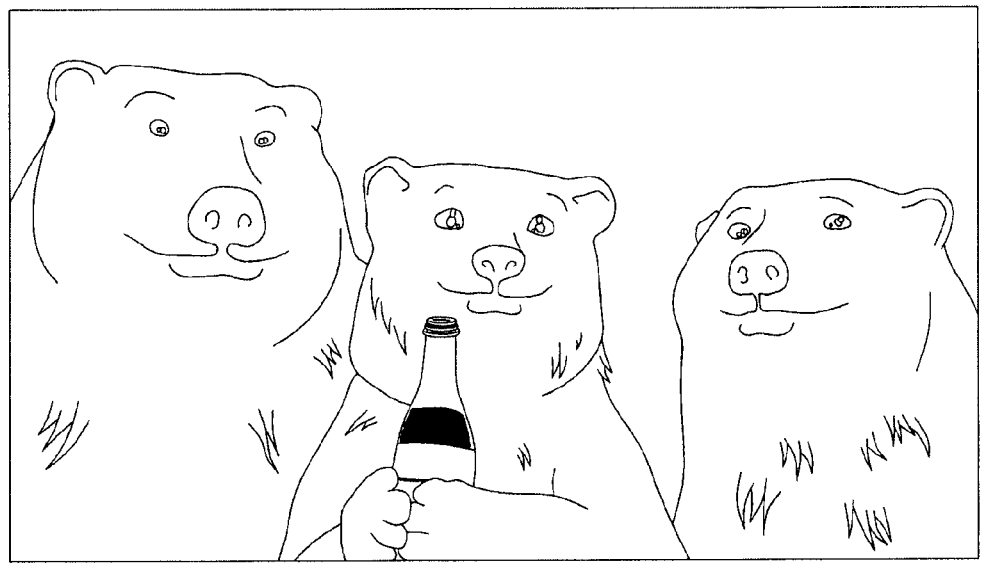
FIG. 13 is a view showing a digital device including a screen for displaying application data.

FIG. 13 is a diagram showing a digital device including a screen for displaying application data.

Referring to FIG. 13, the screen of the digital device displays a predetermined application execution result screen, that is, application data.

Here, the predetermined application may include all kinds of applications available in the digital device, such as broadcast programs, TV applications for electronic program guide (EPG), web browser applications for web services, other games, or applications for social networking services (SNSs). In addition, the predetermined application may include not only application data downloaded and stored in a storage medium such as a memory of a digital device for execution but also streaming applications.

For convenience, FIG. 13 shows application data according to execution of a TV application for a broadcast program of a predetermined channel as one embodiment.

FIG. 14 is a view illustrating a menu configuration related to a multi-view function according to one embodiment of the present invention and FIG. 15 is a view showing implementation according to selection in the menu configuration of FIG. 14.

As described above, fundamentally, the multi-view function refers to a function supporting all scenarios for providing one application and one menu or two or more applications on a screen. In order to support such a multi-view function, a screen may be supported in the multi-view manner and the multi-view function is also referred to as a multi-view screen.

Fundamentally, the multi-view function may be provided to be accessed in the form of predetermined menu items of a whole menu as shown in FIG. 14*a* or to be accessed in the form of a menu for only the multi-view function as shown in FIG. 14*b*. The multi-view functions of FIGS. 14*a* and 14*b* are not limited to the above description. For example, the multi-view function of FIG. 14*b* may be provided in the form of sub-menu items of FIG. 14*a*, and vice versa.

FIG. 14*a* shows a menu including a first part 1410 which comprises history data as a web launcher and a second part 1420 which has a list of available applications or functions. Here, the first part 1410 may be referred to as a recent part and the second part 1420 may be referred to as an application part. In addition, among the menu items indicating the applications and/or functions listed in the second part 1420 of FIG. 14*a*, a predetermined menu item 1422 may be related to the multi-view function according to the present invention.

In FIG. 14*a*, when a signal for selecting the multi-view menu item 1422 is received, the digital device may process the selected menu item to be displayed to be located at a place higher than the other menu items so as to identify the selected menu item. Although the selected menu item is shown as being displayed to be located at a place higher than the other menu items so as to identify the selected menu item in the drawing, the present invention is not limited thereto. Accordingly, the present invention may include all methods of differentiating a selected menu item from the other menu items so as to identify the selected menu item. As such methods, for example, at least one of increase in size of the selected menu item, highlight, color change and guide data of the selected menu item such as text/audio or a combination thereof is possible.

In addition, in FIG. 14*a*, when the multi-view menu item 1422 is selected, the digital device may align and provide one or more sub-menu items for the multi-view menu item between one or more menu items provided adjacent to the multi-view menu item before selection.

FIG. 14*b* shows multi-view function menu items 1452, 1454 and 1456 having a card shape, configured for only the multi-view function according to the present invention. The menu item 1452 is used to divide a screen (picture by picture (PBP)) into two areas as a multi-view function, and, when the menu item 1452 is selected, the screen is divided into an area 1 and an area 2 as shown in FIG. 15*b*. The menu item 1454 is used to provide a picture-in-picture (PIP) window on the upper right side of a screen as a multi-view function, and when the menu item 1454 is selected, an area 1 and an area 2 are provided as shown in FIG. 15*b*. The menu item 1456 is used to provide a plurality of PIP windows at the right side of the screen as a multi-view function and, when the menu item 1456 is selected, an area 1 and areas 2 to 4 are provided as shown in FIG. 15*c*. In association with the menu item 1454, the location or the area of the PIP window provided at the upper right side may be arbitrarily changed. In addition, in association with the menu item 1456, the location, size or color of the plurality of PIP windows provided at the right side of the screen may be arbitrarily changed.

The first menu item 1452 of FIG. 14*b* indicates, for example, a multi-view function for dividing the screen into two areas and providing data in the two areas according to execution of two applications when two applications are simultaneously requested to be processed or when one application is executed and then an additional application is newly requested to be executed.

Although not shown, the digital device may further enable selection of applications to be executed in screens or windows when the first menu item 1452 is accessed. Alternatively, when a first application is executed and then a request for executing a second application is received, if the function for dividing the screen into two windows as a multi-view function is selected, the application data of the first application may be provided in the first window (left window) and the application data of the second application may be provided in the second window (right window) by default. In addition, the sizes of the first and second windows of the screen may be arbitrarily adjusted according to application attributes. The application attributes may mean the types, genre, preferences, etc. of the application, for example, and may be automatically or manually determined.

Although the menu item 1452 of FIG. 14*b* is used to divide the screen into two areas, the screen may be divided into three areas or four areas by continuously selecting the item, thereby controlling the number of windows.

The same is true in the menu item 1454 and the menu item 1456 of FIG. 14*b*. That is, the size, location, etc. of each window may be arbitrarily changed.

Although the areas or windows are accessed to select applications or functions to be output in the areas or windows even in the state of FIG. 14*b*, an area may be directly accessed to change the already provided application even in the state of providing the area on the screen as shown in FIGS. 15*a* to 15*c*. For example, referring to FIG. 15*a*, the screen is divided into the area 1 and the area 2 and, when the area 2 is selected, the digital device may output the menu for functions or applications which may be provided in the area 2. When a function or application is selected from the output menu, the selected function or application may be provided in the area 2 of FIG. 15*a*.

FIG. 15*d* shows the configuration of any one area of FIG. 15*a*, the area 2 of FIG. 15*b* or at least one of the areas 2 to 4 of FIG. 15*c*, for example. Referring to FIG. 15*d*, a channel banner 1512, a first icon 1514, a second icon 1516, etc. are provided in the window for the area. The channel banner 1512 may change to a title, etc. according to the application output in the window or area. In addition, the first icon 1514 may be a functional icon for window deletion, color change, size change, etc. The second icon 1516 may be a functional icon for requesting detailed information of the application provided in the window.

FIG. 16 is a view illustrating detailed operation of FIG. 14*a*.

Referring to FIG. 16*a*, a first part 1610 and a second part 1620 of a launcher exist and, according to the present invention, a multi-view function menu item 1622 is included in the second part 1620.

In FIG. 16*a*, when the multi-view function menu item 1622 is selected, the digital device may reconfigure the second part as shown in FIG. 16*b*. In the reconfigured second part, sub-menu items 1630 related to the multi-view function are provided around the selected multi-view function menu item. In FIG. 16*b*, the sub-menu items corresponding to channels are shown on the assumption that an application provided on a screen is an execution screen of a TV application for a broadcast program, for convenience. The sub-menu items may be a list of favorite channels or channels or broadcast programs belonging to the same genre or adjacent channels in relation to the broadcast program provided on the screen.

Alternatively, when the multi-view function menu item 1622 is selected, the digital device reconfigures the second part as shown in FIG. 16*b* and the reconfigured second part may provide all available applications for selecting an application (channel) to be used for the multi-view function, for example. The selected application may be provided as a sub-menu item later upon executing the multi-view function according to a user request.

Alternatively, in FIG. 16*b*, when the multi-view function menu item 1622 is selected, the digital device may provide the second part as shown in FIG. 16*c*. In FIG. 16*c*, unlike FIG. 16*b*, the menu items provided via the second part do not change. That is, in FIG. 16*c*, the sub-menu items for the multi-view function shown in FIG. 16*b* are not provided. However, in FIG. 16*c*, one or more menu items related to the multi-view function among the menu items provided via the second part may be differentiated and provided unlike FIG. 16*a*. Differentiation may be achieved using various methods such as highlight, color change, edge treatment, size change, etc. In FIG. 16*c*, the hatched menu items of the channel list are the menu items related to the multi-view function and the other menu items are menu items which belong to the second part but are not related to the multi-view function.

Figure 17:
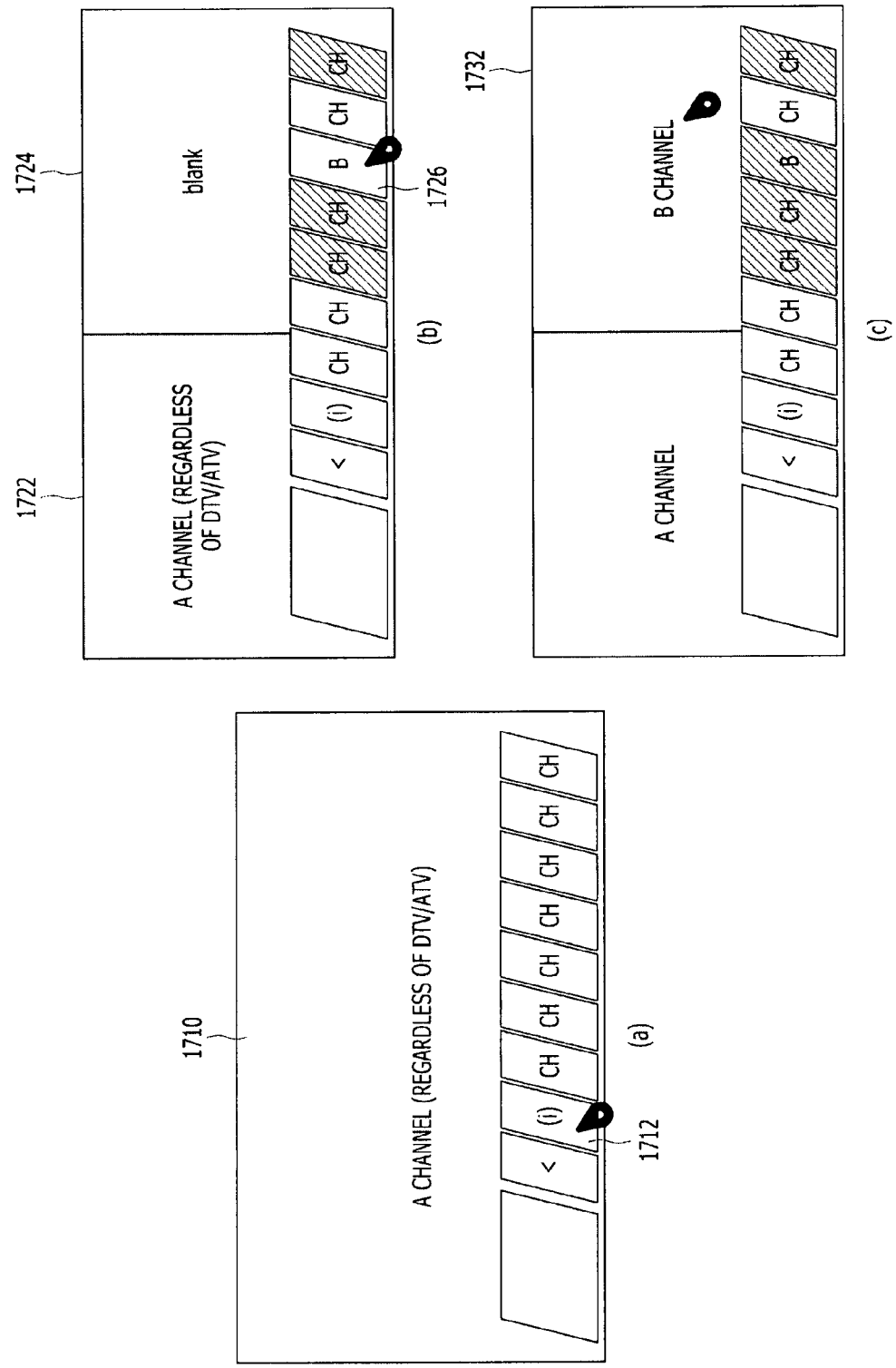
FIG. 17 is a view illustrating processing of a multi-view function in a digital device according to one embodiment of the present invention.

FIG. 17 is a view illustrating processing of a multi-view function in a digital device according to one embodiment of the present invention.

Referring to FIG. 17*a*, a TV application (channel A) is executed on the screen of the digital device to provide an execution screen thereof and a launcher according to menu calling of a user is provided on the execution screen. When the multi-view function menu item 1712 of the second part is selected, the digital device reconfigures and provides the screen as shown in FIG. 17*b*.

The reconfigured screen includes a first area 1722 and a second area 1724 as shown in FIG. 17*b*. The first area 1722 continuously provides the execution screen of the TV application already provided in FIG. 17*a*. Unlike FIG. 17*a*, in FIG. 17*b*, as the screen is divided into two areas, the quality, size, etc. of the execution screen of the TV application provided via the first area 1722 are adjusted. The second area 1724 may be blank as shown in FIG. 17*b*. At this time, in the second area 1724, guide data "blank" or "Select a desired application/channel" may be provided. Alternatively, in the second area 1724, one application having highest priority or any one application of an application list for a predetermined multi-view function may be provided while reconfiguring the screen as shown in FIG. 17*b*, simultaneously with selection of the multi-view function menu item 1712 as shown in FIG. 17*a*.

Referring to FIG. 17*b*, the menu may be provided differently from FIG. 17*a* according to selection of the multi-view menu item 1712 in FIG. 17*a*. This may be achieved by providing the sub-menu items by reconfiguration or differentiating the existing menu items as shown in FIG. 16. Referring to FIG. 17*b*, the second area 1724 is blank and, when a menu item or a sub-menu item 1726 is selected from the second part of the menu, the digital device provides the execution screen of the TV application for a B channel corresponding to the menu item 1726 in the second area 1732.

Referring to FIGS. 17*b* and 17*c*, unlike the menu item of the second part of FIG. 17*a*, after the multi-view function menu item 1712 of FIG. 17*a* is selected from among the menu items, only the related menu items are provided to be differentiated from the other items. In FIG. 17*b*, the menu item 1726 of the B channel is first not highlighted, but is optionally highlighted along with the other menu items having the multi-view function in FIG. 17*c* after selecting the multi-view function menu item 1712.

Alternatively, in FIGS. 17*b* and 17*c*, the highlighted menu items show menus which may be activated in order to perform the multi-view function, that is, currently available menus among all menu items, for example. For example, according to the application which is being provided in the first area, the application to be provided in the second area may not be available due to resource problems of a tuner, a decoder and a memory. The digital device may first determine whether a problem such as resource conflict occurs and may not activate the multi-view function even though the multi-view function is previously set when it is difficult to solve the resource problem via a resource sharing method.

Figure 18:
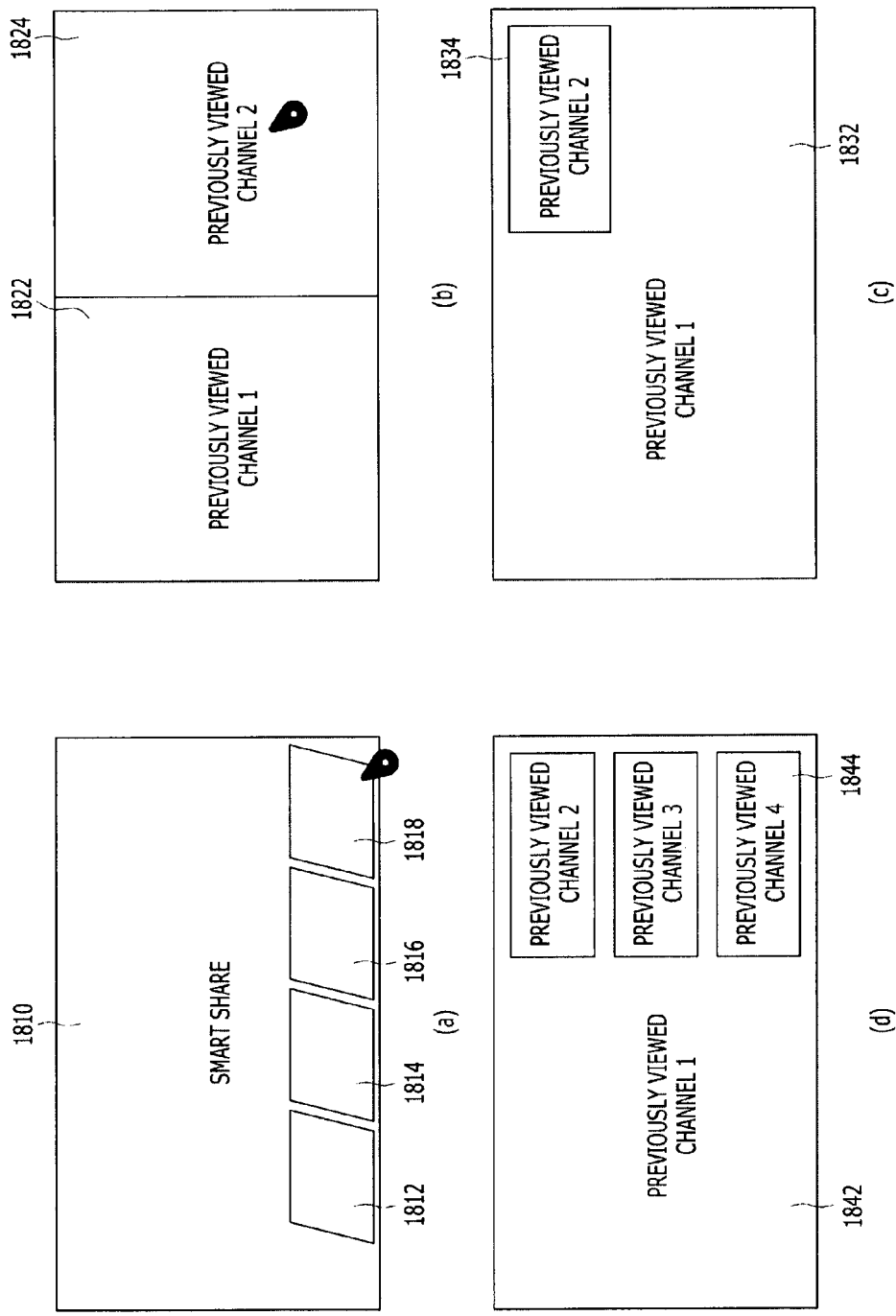
FIG. 18 is a view showing a multi-view function entrance method.

FIG. 18 is a view showing a multi-view function entrance method.

For example, in FIG. 17, entrance into and processing of the multi-view function or mode in a process of executing a TV application for live TV viewing which is a general viewing pattern were described.

FIG. 18 relates to use of a multi-view function when a smart share application is used via a full screen, unlike FIG. 17.

In this case, as shown in FIG. 18a, when the smart share application is used, menu items 1812 to 1818 each having a card shape as shown in FIG. 14b may be provided as menu items.

As shown in FIG. 18a, the digital device may configure and provide a screen as shown in FIG. 18b when a signal for selecting a menu item 1818 having a card shape is received in the process of using the smart share application. Here, the menu item 181 having the card shape of FIG. 18a may be the menu item 1452 of FIG. 14b. Alternatively, the menu item 1818 having the card shape may be a menu item for an application mapped to history data belonging to the first part, that is, the recent part of the menu launcher.

In addition, the smart share application of FIG. 18a provides the menu items 1812 to 1818 each having the card shape as menus as described above and the menu items may indicate the history data of the recent part of the menu launcher.

In FIG. 18b, according to selection of the menu item 1818, the screen may be divided into two areas, a previously viewed channel 1 may be provided in the first area and a previously viewed channel 2 may be provided in the second area 1824.

The menu items continuously provided even upon screen change in FIGS. 17 and 18a may not be provided in FIGS. 18b to 18d.

Accordingly, the digital device may configure and provide the screen as shown in FIG. 18c or 18d when an access signal for the second area 1824 for providing the previously viewed channel 2 is received.

For example, when the size of the second area 1824 of FIG. 18b is reduced, as shown in FIG. 18c, the first area 1832 is provided via the full screen and the second area 1834 may be provided in the form of a PIP window according to the size change signal.

When a key button signal related to the multi-view function is received via an input unit in FIG. 18c or when a user points, hovers on or selects the second area 1824, as shown in FIG. 18d, the screen may be provided in the form of multiple PIP windows. In this case, the first area 1842 provided in FIG. 18c does not change, but, in a second PIP window and a third PIP window excluding a first PIP window, a predetermined or related application may be executed to provide an execution screen or an application list for a screen to be provided in the PIP window may be provided.

Alternatively, when a key button signal related to the multi-view function is received via an input unit or when a user points, hovers on or selects the second area 1824, the digital device may separately provide the menu related to the multi-view function in the selected second region and configure and provide the screen as shown in FIG. 18c or 18d according to selection.

Figure 19:
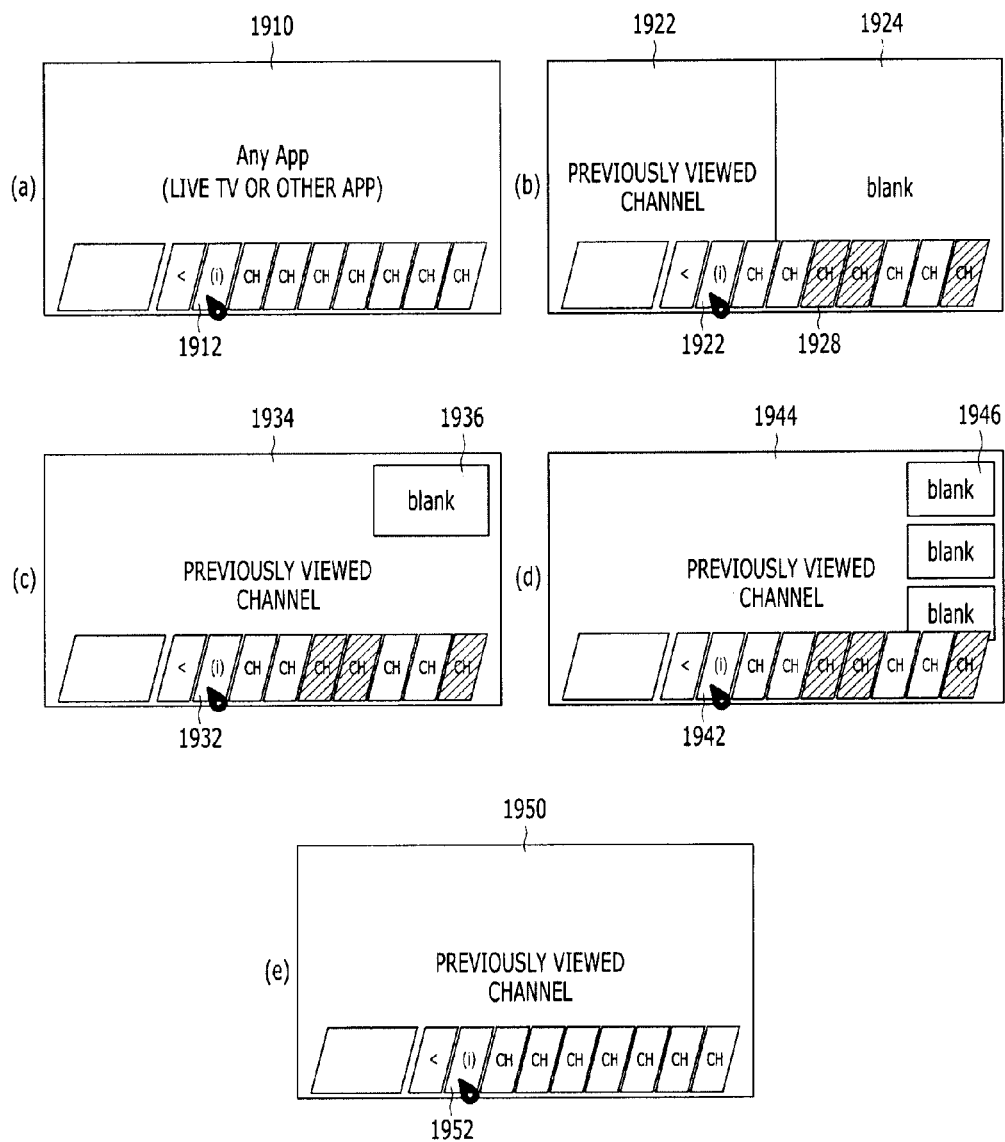
FIG. 19 is a view illustrating a multi-view function control method according to one embodiment of the present invention.

FIG. 19 is a view illustrating a multi-view function control method according to one embodiment of the present invention, and FIG. 20 is a view illustrating change in multi-view function menu item used in a multi-view function control method shown in FIG. 19.

In FIGS. 19a to 19d, a screen is configured similarly to FIGS. 15a to 15c or FIGS. 18a to 18c. However, in FIGS. 19a to 19e, the menu is continuously maintained even when the screen changes.

In FIGS. 19a to 19e, control is performed only by accessing the multi-view function menu items 1912, 1922, 1932, 1942 and 1952 of the second part of the menu launcher. For example, in the screen configuration of FIG. 19a, the multi-view function menu item 1912 of the second part of the menu launcher may include an icon shown in FIG. 20a. Accordingly, when the multi-view function menu item 1912 is selected, as shown in FIG. 19b, the screen is divided into two areas. At this time, the multi-view function menu item 1922 of FIG. 19b changes to a menu item including an icon shown in FIG. 20b, for example. When the multi-view function menu item 1922 of FIG. 19b is selected, as shown in FIG. 19c, the screen changes to a multi-view screen including a single PIP window. At this time, in FIG. 19c, the multi-view function menu item 1932 may be provided as shown in FIG. 20c. When the multi-view function menu item 1932 of FIG. 19c is selected, as shown in FIG. 19d, the screen changes to the multi-view screen including multiple PIP windows. At this time, the multi-view function menu item 1942 of FIG. 19d may be provided as shown in FIG. 20d. When the multi-view function menu item 1942 is selected in FIG. 19d, as shown in FIG. 19e, the multi-view screen is provided. Here, the multi-view screen of FIG. 19e may or may not be equal to that of FIG. 19a. However, the multi-view screen configuration is similar.

Referring to FIGS. 19 and 20, the user may continuously access only the multi-view function menu items from the provided menu, such that the digital device changes and provides the screen configuration in predetermined order whenever the multi-view function menu item is accessed as shown in FIGS. 19a to 19e. In one embodiment of the present invention, the screen configuration/change order may be set and processed differently from the above description.

The multi-view function menu item may be selected via a multi-view function button provided on a front panel of a digital device, a multi-view function key button provided on an input unit such as a remote controller, predetermined voice, a gesture, fingerprint recognition, facial recognition, eye recognition (pupil, iris, etc.), etc.

FIGS. 19 and 20 are different from other embodiments in that the multi-view functions are sequentially and variously provided by repeatedly accessing the same function key signal.

Figure 21:
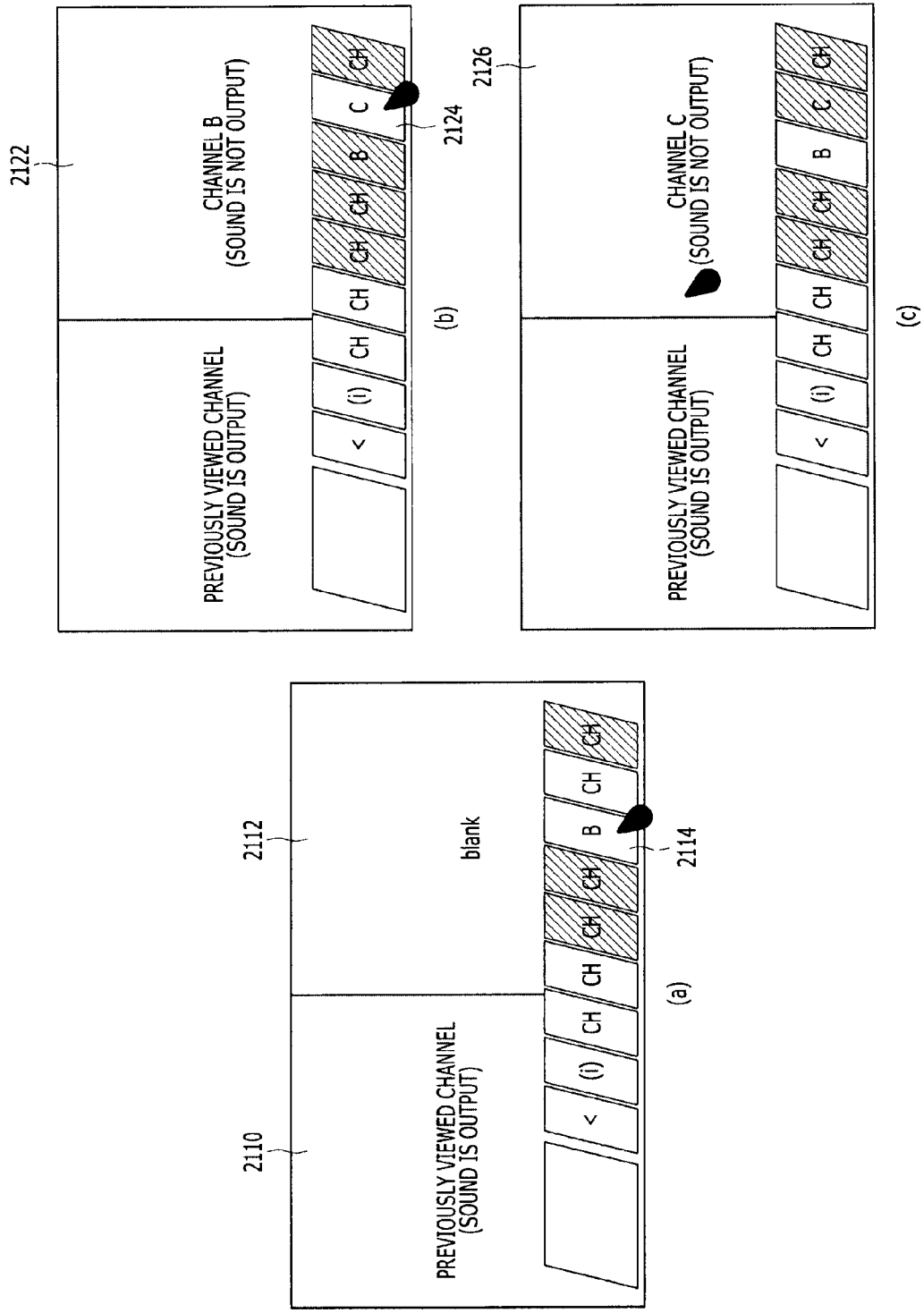
FIG. 21 is a view illustrating an application data processing method in a first multi-view mode according to one embodiment of the present invention.

FIG. 21 is a view illustrating an application data processing method in a first multi-view mode according to one embodiment of the present invention.

Although sound output control in a first multi-view mode (the screen is divided into two areas) is shown in FIG. 21, image quality may be individually controlled in addition to sound.

For example, as shown in FIG. 21, in an initial screen of a first multi-view mode, unlike a first area 2110, a second area 2112 may be provided as blank. In this case, although the screen includes two areas, only one application is executed and a sound output problem may not occur.

However, as shown in FIGS. 21b and 21c, when an application is executed in the second area 2112 according to user selection and thus two applications are simultaneously displayed on the screen, sound control is required.

Although control changes according to settings, fundamentally, as shown in FIG. 21b, the digital device performs control to assign priority to the application for the previously viewed channel of the first area to output the sound of the application for the previously viewed channel of the first area and not to output the sound of the application for a channel B of the second area 2122.

When a menu item 2124 of a channel c is selected from among the menu items in FIG. 21b, the channel B which is being displayed in the second area 2122 may output the channel c as shown in FIG. 21c according to selection.

Although priority of sound output is continuously assigned to the first area even in FIG. 21c, it may be determined that interest in the application of the second area is higher than that in the application of the first area because the user accessed the application of the second area, and the priority of sound output may change from the first area to the second area when the application first provided in the second area is accessed, that is, changed or controlled. Access may be determined according to a predetermined number of accesses or a predetermined access time. In other words, when the user continuously accesses the second area, it may be determined that interest in the second area is higher than that in the first area. Therefore, when the number of accesses or the access time is used as reference data used to more accurately determine the intention of the user, it is possible to provide an intelligent multi-view function in accord with the user's intention and use convenience of the digital device by the user.

In FIG. 21, when a home theater is configured to provide 5.1-channel sound or 6.1-channel sound or two or more sound output devices connected via an earphone or Bluetooth are present, sound output control of the first area and the second area may be respectively performed unlike the above description. That is, the sound of the first area may be output via a speaker and the sound of the second area may be output via another digital device such as an earphone.

In addition, for an application of an area in which sound output is impossible, a caption or subtitle may be provided to increase user convenience. In this case, a process of requesting, receiving and providing caption or subtitle data from an external service server such as a web server or a broadcast server may be automatically performed, if necessary. As described above, it is apparent that the caption or subtitle data may be transmitted to another digital device instead of the screen of the digital device.

Figure 22:
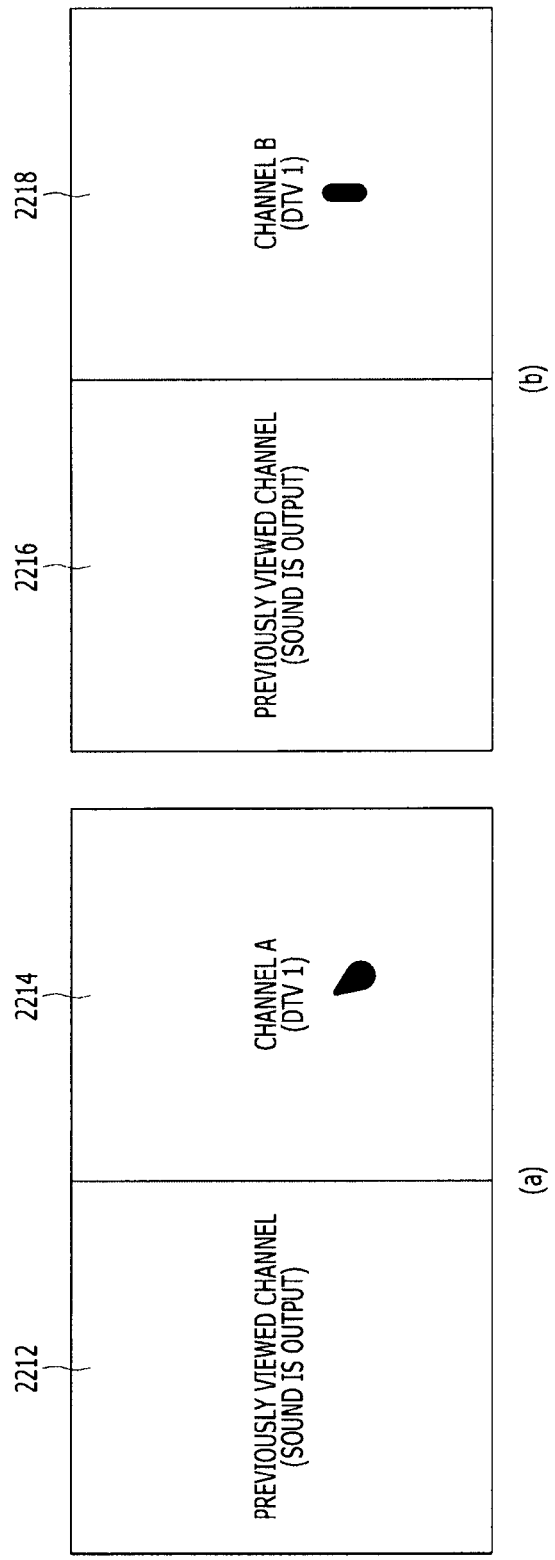
FIG. 22 is a view illustrating multi-view screen control according to one embodiment of the present invention.

FIG. 22 is a view illustrating multi-view screen control according to one embodiment of the present invention.

FIG. 22 shows, for example, a method of conveniently controlling a multi-view screen without a separate menu item or sub-menu item, unlike FIG. 21.

For example, whereas an application of each area of the multi-view screen changes via a provided menu launcher in FIG. 21, the application of the each area of the multi-view screen is controlled only via an input unit instead of the menu launcher in FIG. 22.

For example, referring to FIG. 22a, a first area 2212 and a second area 2214 configure a multi-view screen. Here, the first area 2212 provides a previously viewed channel and outputs sound. The second area 2214 provides a channel A but does not output sound.

Here, assume that a user wants to change the application of the second area 2214. In this case, in FIG. 21, a desired application (or channel) is selected from the menu. However, when the menu is not being provided, the application which is being provided in the second area 2214 may be changed and controlled by calling the menu launcher and performing several operations or passing through several depths of the menu.

However, the present invention provides a method of more conveniently controlling change of the application of each area upon utilizing a multi-view function. For example, when a predetermined key button is pressed in a state of locating a pointer of an input unit in the second area 2214, the pointer may change as shown in FIG. 22b. When an input signal is received via a wheel or a directional key button of the input unit after the pointer has changed, the application already output in the second area 2218 may change.

As shown in FIG. 22, when the wheel moves or a signal is received via the directional key button simultaneously with or after change of the pointer, the digital device may provide a variety of guide information or an application list related to application change control.

Although movement of the wheel of the input unit, reception of the signal via the directional key button, etc. are described for application change control in FIG. 22, application change control may be performed by a variety of sensing data such as gesture, voice or pupil movement or a combination thereof.

Figure 23:
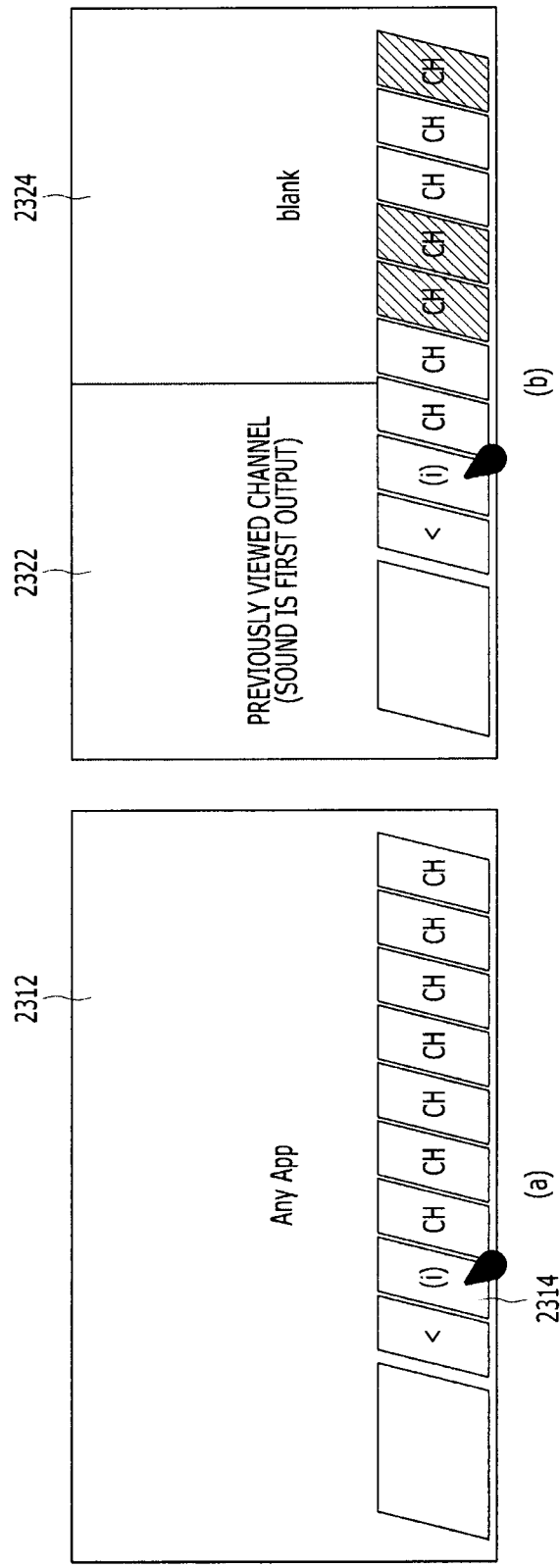
FIG. 23 is a view illustrating a first multi-view mode according to another embodiment of the present invention.

FIG. 23 is a view illustrating a first multi-view mode according to another embodiment of the present invention.

In FIG. 23a, a first application is being provided on a full screen and a menu launcher is overlaid the screen on which the application is executed.

When the user selects a multi-view function menu item 2314, as shown in FIG. 23b, the first multi-view mode (the screen is divided into two areas) may be executed, a second application may be provided in the first area 2322, and a blank screen or a third application may be provided in the second area 2324. At this time, instead of the first application, the second application is executed in the first area 2322.

Referring to FIG. 23b, the menu items related to the multi-view menu item may be displayed in the second part of the menu launcher to be differentiated from the other menu items (for example, the hatched menu items of FIG. 23b) according to selection of the multi-view function menu item 2314 in FIG. 23a.

Figure 24:
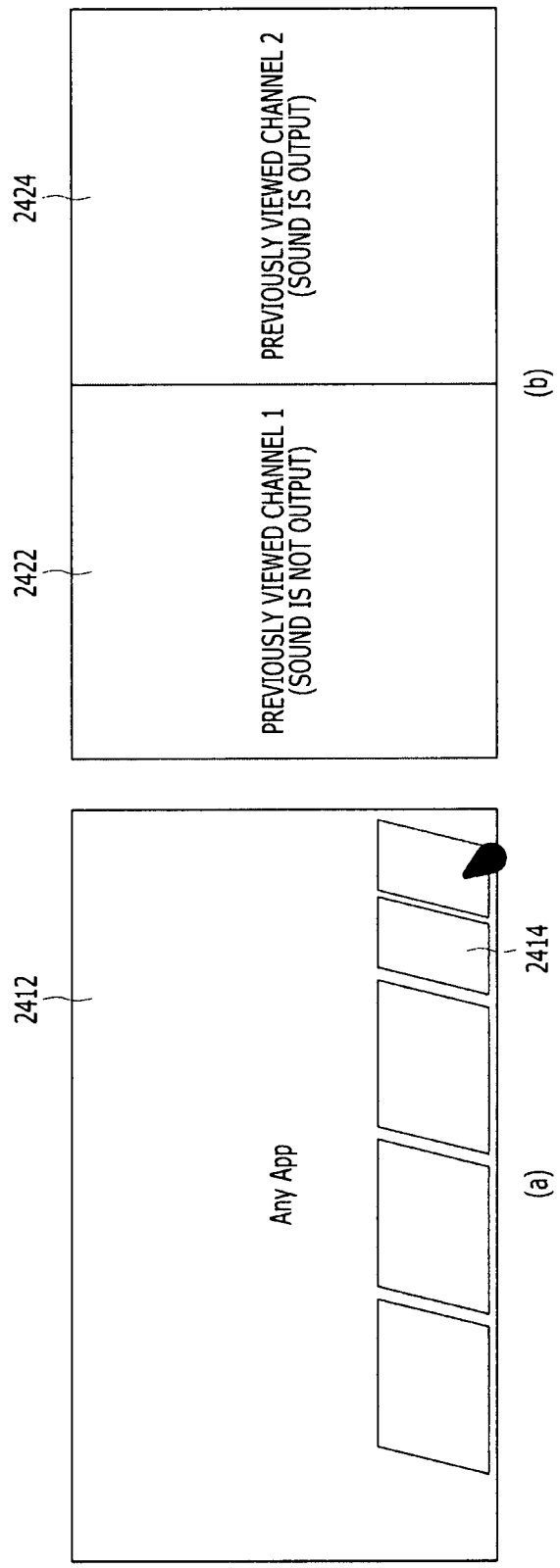
FIG. 24 is a view illustrating a first multi-view mode according to another embodiment of the present invention.

FIG. 24 is a view illustrating a first multi-view mode according to another embodiment of the present invention.

Unlike FIG. 23a, in FIG. 24a, the first application is being provided on the full screen and a smart share application or multi-view menu items are provided instead of the menu launcher.

When a specific multi-view menu item 2414 is selected, as shown in FIG. 24b, the screen is divided into two areas, the second application is provided in the first area 2422 and the execution screen of the third application is provided in the second area 2424.

In FIG. 24b, unlike FIG. 23b, the multi-view menu items may be removed and the sound of the application executed in the second area 2424 may be output instead of the first area 2422.

The second application may or may not be equal to the first application.

The applications respectively displayed in the first area 2422 and the second area 2424 may be determined in the state of FIG. 24a or may be predetermined, for example.

As shown in FIG. 24b, when any area is re-accessed after providing the application execution screens in the first area 2422 and the second area 2424, at least one of various menu items for sound output control, application change control, multi-view mode end control, control of functions provided by other devices, etc. may be provided to control a multi-view function.

Figure 25:
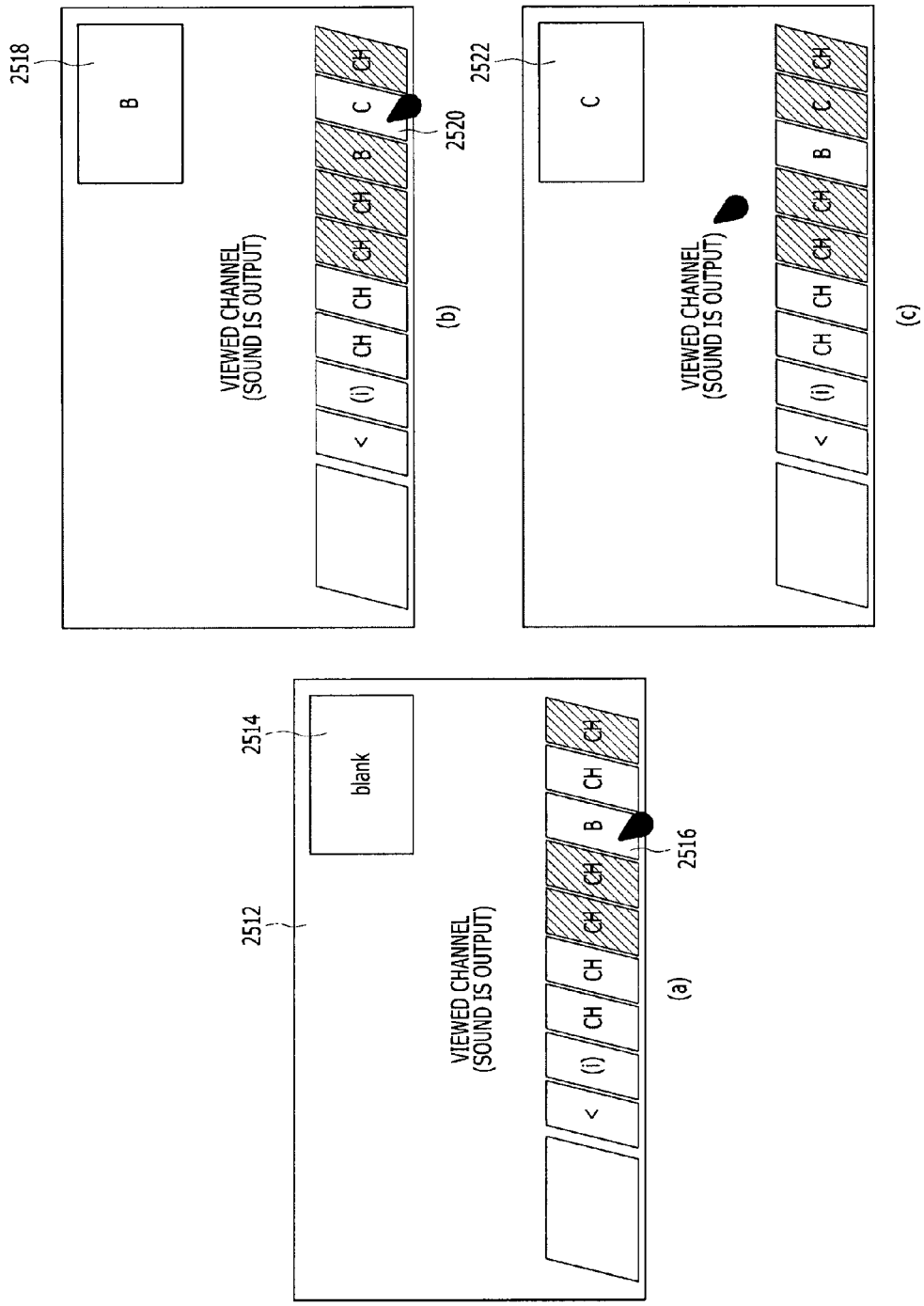
FIG. 25 is a view illustrating a second multi-view mode according to one embodiment of the present invention.

FIG. 25 is a view illustrating a second multi-view mode according to one embodiment of the present invention.

In FIG. 25, a second multi-view mode, that is, a single PIP window, is supported. At this time, the second multi-view mode may be directly accessed from the menu launcher or via the first multi-view mode.

FIG. 25a shows the former case, that is, the second multi-view mode accessed via the menu launcher. The multi-view menu item may be accessed from the provided menu launcher to directly execute the second multi-view mode. Therefore, as shown in FIG. 25a, a single PIP window 2514 is provided on a first application execution screen 2512 provided on the full screen.

As shown, the single PIP window 2514 may be provided on the screen to be overlaid on the first application execution screen 2512 but not to overlap the menu launcher.

In FIG. 25a, as described above, when the second multi-view mode is executed, the single PIP window 2514 may be provided and the single PIP window 2514 may be first provided as a blank screen. Accordingly, in order to select an application to be executed in the single PIP window 2514, the menu launcher provides application menu items related to the multi-view function. When one menu item 2516 is selected from among the multi-view menu items of FIG. 25a, as shown in FIG. 25b, the application execution screen corresponding to the selected menu item 2516 may be provided in the PIP window 2518.

Alternatively, a predetermined application execution screen may be provided in the single PIP window 2514.

In FIG. 25b, when a new menu item 2520 is selected from the menu launcher in a process of executing and providing an application B in the single PIP window 2518, the digital device executes an application C instead of an application B which is being provided in the single PIP window 2522 and provides an execution screen of the application C, as shown in FIG. 25c.

In FIG. 25b, even when the pointer does not access the single PIP window 2518 for providing the execution screen of the application B in advance, the execution application of the PIP window may automatically change by selecting the new application menu item 2520 from the menu launcher. At this time, in some cases, when the new application menu item 2520 is selected, guide data may be provided so as to select an output area.

In FIG. 25a, the PIP window may not be first provided as a blank screen, but, as a multi-view function menu item is selected, sub-menu items related thereto may be output and, when one sub-menu item (e.g., a menu item 2516) is selected, the PIP window may be provided. Providing the single PIP window according to selection may distinguishably provide the first multi-view mode, the second multi-view mode and the third multi-view mode on the multi-view function menu items via icons, images, text, etc. to increase user selection convenience.

Figure 26:
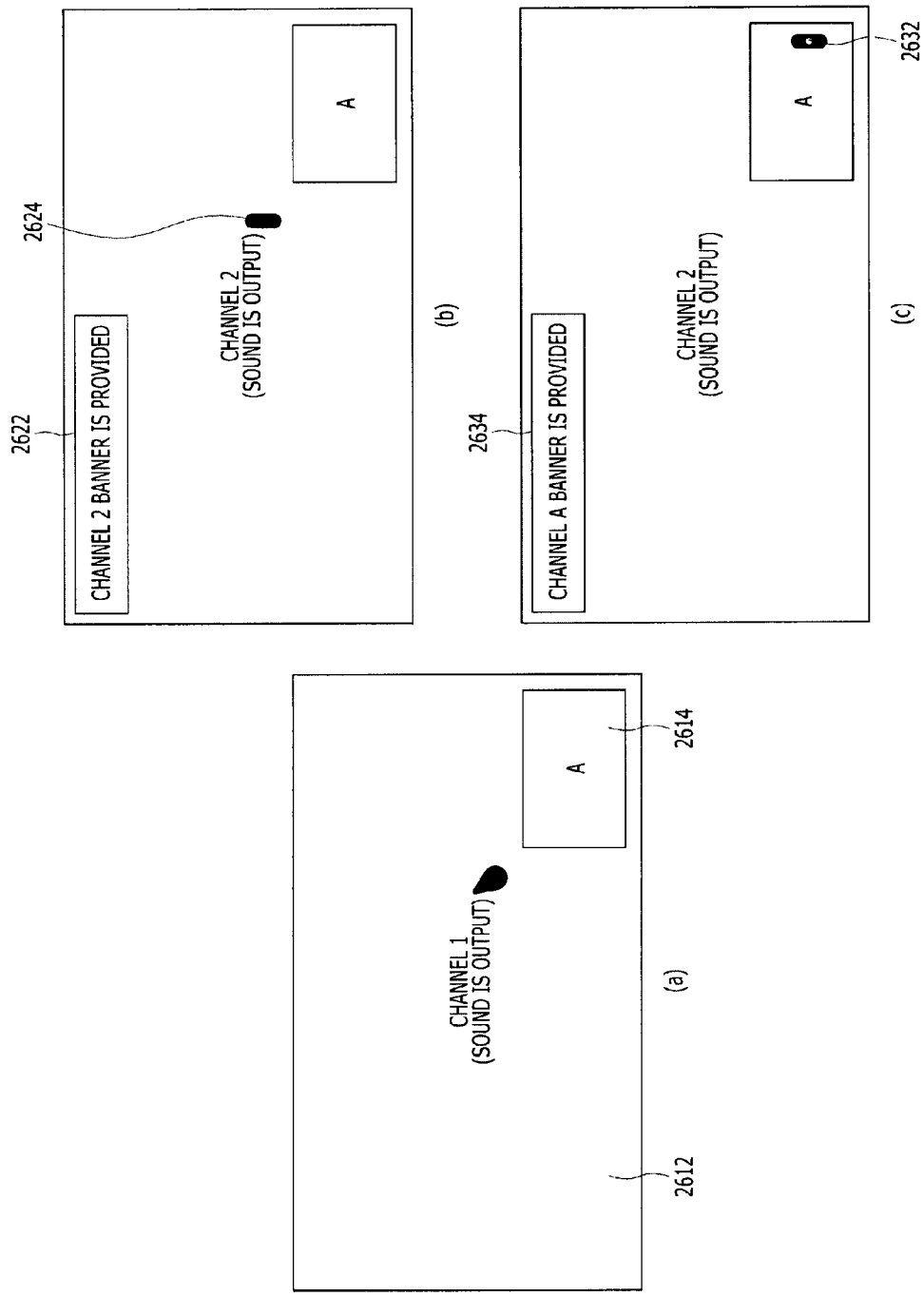
FIG. 26 is a view illustrating an application control method in a second multi-view mode according to one embodiment of the present invention.

FIG. 26 is a view illustrating an application control method in a second multi-view mode according to one embodiment of the present invention.

In particular, FIG. 26 illustrates a method of easily and conveniently controlling a multi-view function even when a separate menu launcher is not provided after executing the multi-view mode.

FIG. 26a relates to the second multi-view mode, wherein a first application is provided via a full screen 2612 and a single PIP window 2614 is provided in a predetermined area of the screen.

Referring to FIG. 26a, a pointer is located in an area 2612 in which the first application execution screen is provided. Here, when the first application which is being provided in the area 2612 is desired to be changed, the shape of the pointer 2624 is changed as shown in FIG. 26b by long-clicking a predetermined key button or a multi-view mode key button.

When the shape of the pointer changes, the digital device controls operation according to an additional action of the user. For example, in FIG. 26b, the application which is being provided in the area 2612 changes from the first application to a second application (channel 2) by pressing a channel up/down button by the user or via a separate gesture. Reference data (e.g., banner, etc.) for the application changed according to occurrence of the event may be displayed in a predetermined area 2622 of the screen.

FIG. 26c shows the pointer, the shape of which changes via a predetermined action in a state in which the pointer is not in the area 2612 but is in another area, that is, the PIP window area 2614. Thereafter, the application which has been provided in the PIP window area 2614 may change to another application via additional action of the user. At this time, as described above, reference data for the application changed in the PIP window area is provided in a predetermined area 2634.

In FIG. 26, the shape of the pointer may change to various shapes according to an object to be controlled. For example, the pointer may change to a magnifying glass shape when a predetermined area is magnified/reduced.

In summary, in FIG. 26, when the user wants to change the application of a desired area without using a separate menu launcher or a menu item, it is possible to easily control the function of the multi-view mode by locating the pointer in a desired area and pressing a key button of an input unit or making a simple gesture.

Figure 27:
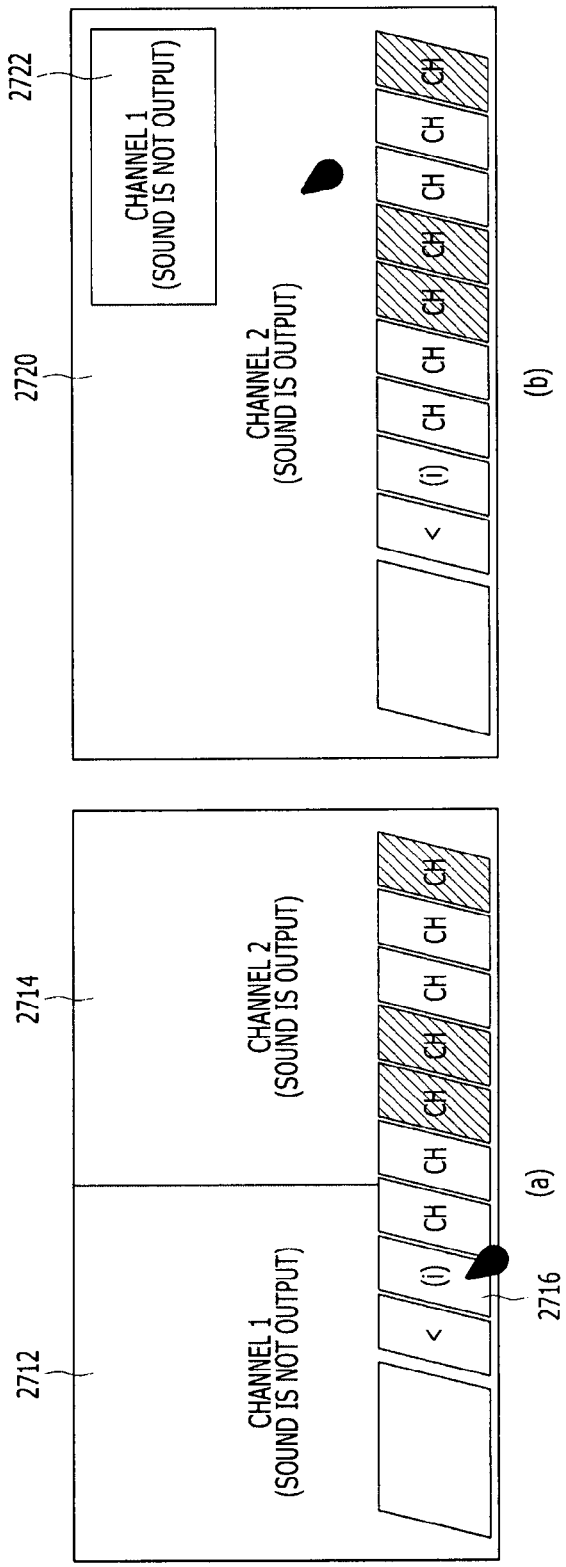
FIG. 27 is a view illustrating a multi-view mode function control method according to another embodiment of the present invention.

FIG. 27 is a view illustrating a multi-view mode function control method according to another embodiment of the present invention.

FIG. 27 shows an embodiment in which a first multi-view mode changes to a second multi-view mode.

FIG. 27a shows the first multi-view mode. Here, when a multi-view function menu item 2716 is pressed, the first multi-view mode automatically changes to the second multi-view mode without a separate action as shown in FIG. 27b.

At this time, referring to FIG. 27b, an execution screen of an application which is being output in a second area 2714 of FIG. 27a is provided on a main screen 2720 and an execution screen of an application which is being output in a second area 2712 of FIG. 27a is provided in a PIP area 2722.

This figure is arbitrarily shown for convenience of description and the present invention is not limited to FIG. 27b. For example, the execution screen of the application which is being provided in the first area 2712 of FIG. 27a may be provided via the main area 2720 of FIG. 27b. In other words, as the first multi-view mode changes to the second multi-view mode, the execution screen of the application to be provided in each area may be provided using various methods.

In contrast, in order to change the second multi-view mode of FIG. 27b to the first multi-view mode of FIG. 27a, the multi-view function menu item 2716 may be pressed or the PIP area 2722 may be magnified to a predetermined size or more according to the above-described method.

Figure 28:
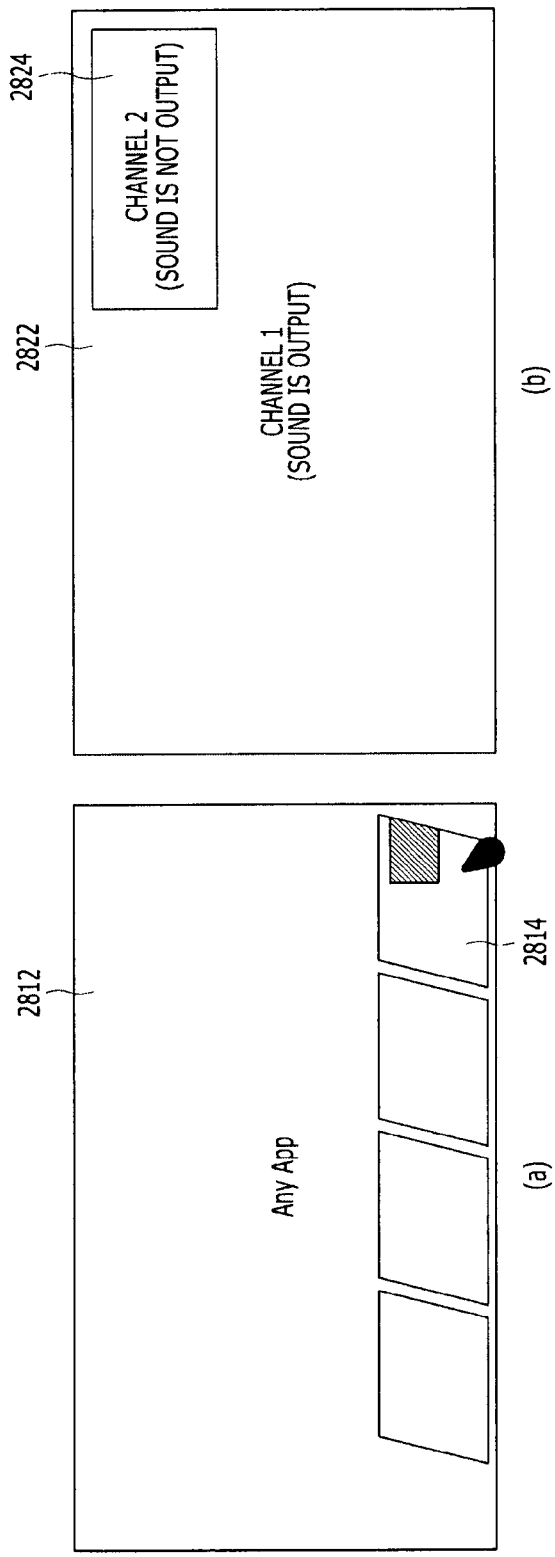
FIG. 28 is a view illustrating a second multi-view mode entrance scenario unlike FIGS. 25 and 27.

FIG. 28 is a view illustrating a second multi-view mode entrance scenario unlike FIGS. 25 and 27.

FIG. 25 shows the case of using the multi-view function menu button and FIG. 27 shows a scenario in which the first multi-view mode changes to the second multi-view mode. In contrast, in FIG. 28a, multi-view mode entrance menu items each having a card shape are provided and a menu item 2814 indicating the second multi-view mode is selected from among the menu items so as to directly enter the second multi-view mode without the first multi-view mode. At this time, in FIG. 28a, a first application execution screen is displayed in a main area 2812.

Referring to FIG. 28b, a second application is executed in a main area 2822 according to selection of a second multi-view mode menu item 2814 of FIG. 28a and a third application is executed in a PIP area 2824.

The second application may be equal or similar to the first application.

Figure 29:
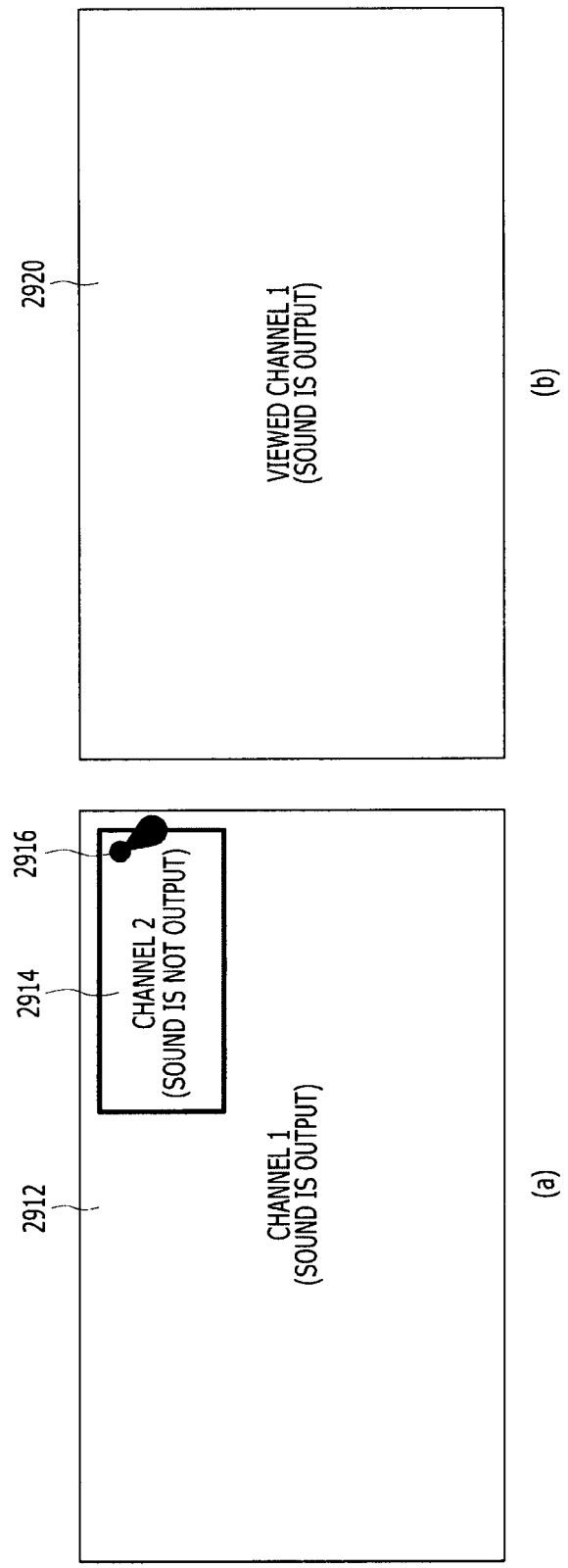
FIGS. 29 to 31 are views illustrating control of a second multi-view mode according to the present invention.
Figure 30:
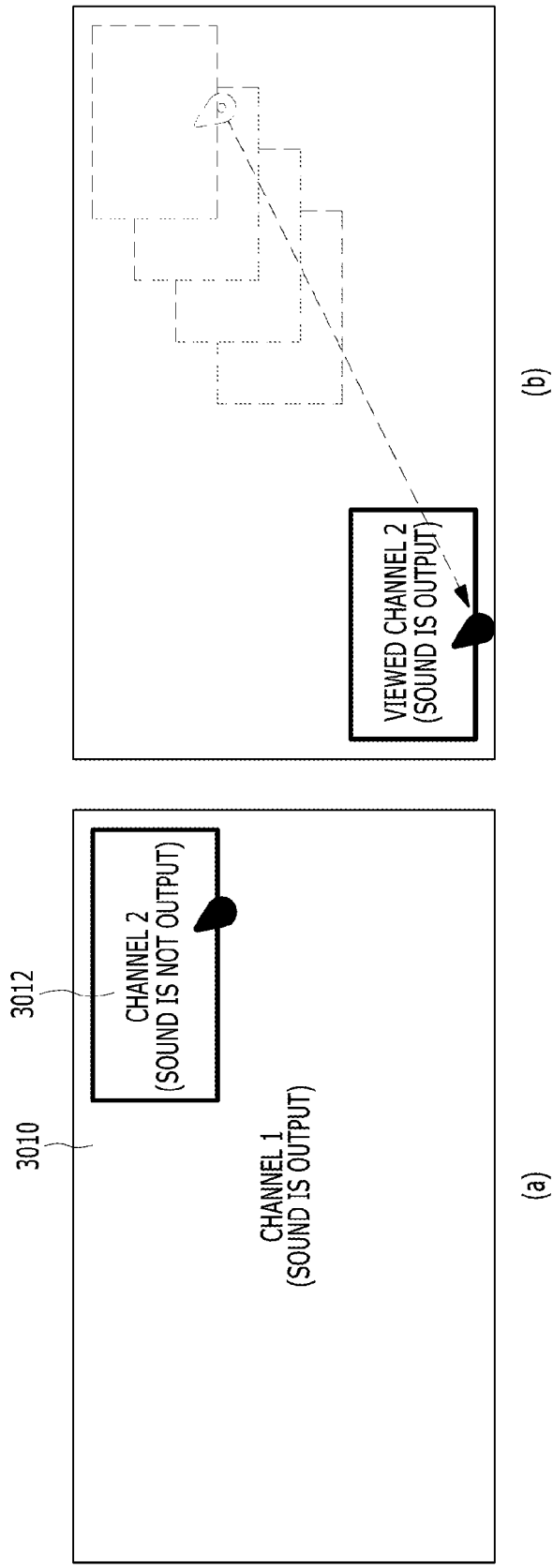
Figure 31:
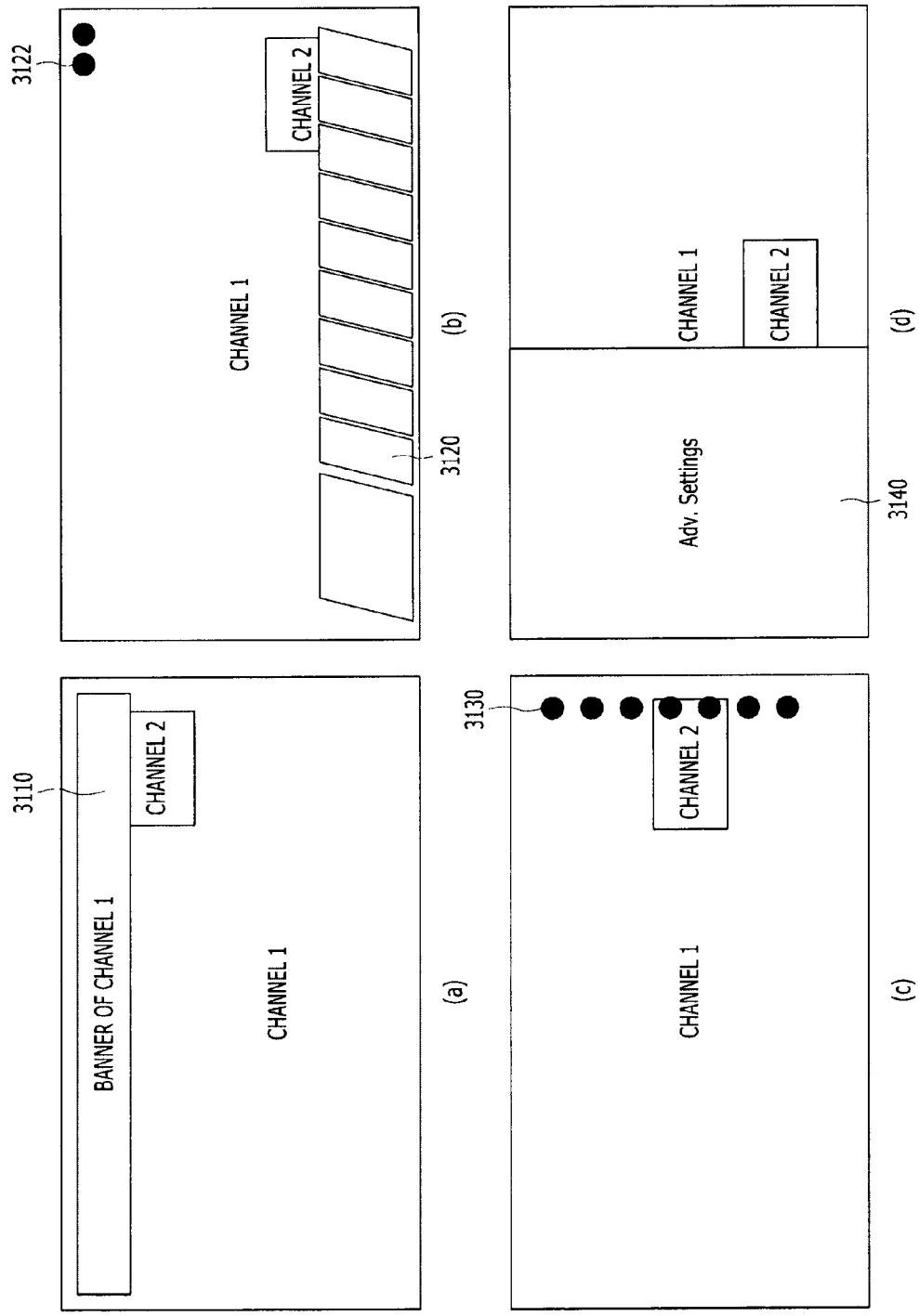

FIGS. 29 to 31 are views illustrating control of a second multi-view mode according to the present invention. In particular, control of the PIP window of the second multi-view mode will be focused upon.

FIG. 29 relates to control of a PIP window and, more particularly, shows a method of deleting a PIP window.

When a pointer accesses a PIP window 2914, the digital device may provide various functional buttons or icons for control of the PIP window. At this time, a deletion icon, a magnifying icon, a size adjustment icon, a sound output control icon, etc. may be provided. These icons may automatically disappear from the screen as the pointer accesses an area other than the PIP window 2914.

Here, when the deletion icon 2916 is selected via the pointer, the digital device deletes the PIP window 2916 from the screen as shown in FIG. 29b. At this time, guide data asking whether user's intention is to delete the PIP window or to end the second multi-view mode according to selection may also be provided.

In FIG. 29b, the application execution screen, which has been provided in the main area 2912 of FIG. 29a, may be continuously provided on the screen 2920 as a full screen.

FIG. 30 relates to control of the PIP window and, more particularly, shows a method of moving the PIP window.

FIG. 30a shows the second multi-view mode, wherein a first application is provided in a main area 3010 and a second application is provided in a second area 3012.

In general, in the second multi-view mode, the PIP window is mainly provided at the upper right side of the screen as shown in FIG. 30a. However, the present invention is not limited thereto.

For example, in FIG. 30a, when the user takes a predetermined action after locating the pointer in the PIP window 3012, the PIP window may be moved into an arbitrary area of the screen as shown in FIG. 30b. At this time, although not shown, the shape of the pointer may change before movement, such that the user recognizes that the PIP window may be moved.

Although not shown, when the pointer is located on each edge of the PIP window, the size of the PIP window may increase/decrease. At this time, the shape of the pointer may change.

FIG. 31 shows a method of providing various UIs such as a banner, a system UI, etc. in a second multi-view mode, for example.

FIG. 31a shows the case in which the PIP window is provided at the upper right side of the screen in the second multi-view mode. At this time, when any area of a main area for providing a first application execution screen is accessed, a banner UI 3110 for the first application is provided. At this time, the provided banner UI 3110 is mainly provided at the uppermost side of the screen, the banner UI may overlap the PIP window. In general, the banner UI 3110 is temporarily provided during a predetermined time and thus, even when the banner UI overlaps the PIP window as described above, the banner UI 3110 may be output at a higher layer. In other words, the banner UI may be output at a highest layer in the area of the screen, in which the banner UI 3110 is provided. Although not shown, as described above, when the overlap area occurs in the process of providing the banner UI 3110, the location of the PIP window which is already output in the area may be arbitrarily or temporarily adjusted to prevent the overlap area from occurring. In contrast, the PIP window may not change and the banner UI is arbitrarily controlled (e.g., size adjustment, etc.), thereby preventing the overlap area from occurring.

FIG. 31b shows the case in which the PIP window is provided at the lower right side of the screen in the second multi-view mode. At this time, when a menu launcher output request signal is received while executing the first application, the digital device outputs a lastly requested menu launcher 3120 at a highest layer of the screen. Accordingly, referring to FIG. 31b, some of the PIP window is hidden due to the output of the menu launcher 3120.

Even in FIG. 31a, as described above, even when the PIP window is currently output, since the user wants to view the lastly requested menu launcher, the screen is configured based on the menu launcher regardless of occurrence of the overlap area. This is only exemplary and the PIP window may be arbitrarily moved to a non-overlap area when the menu launcher is output.

FIG. 31c shows the case in which the PIP window is provided at the right side of the screen in the second multi-view mode. At this time, when a system UI 3130 is output at the right side of the screen similarly to the PIP window, the digital device outputs the system UI 3130 on the screen at a highest layer despite overlapping with the PIP window.

FIG. 31d shows the case in which the PIP window is provided at a lower center side of the screen in the second multi-view mode. In this case, unlike the menu launcher of FIG. 31b, when a setting menu request signal shown in FIG. 31d is received, the digital device provides a setting menu 3140 at a highest layer despite occurrence of the overlap area with the PIP window.

As described above, when some of the PIP window is hidden due to overlap, the PIP window may be arbitrarily moved to avoid overlap. At this time, the PIP window may be moved only when at least half of the PIP window is hidden by the overlap area. For example, in FIG. 31a, when the banner UI hides at least one half of the PIP window, it may be difficult to access the PIP window. Therefore, only in this case, the location of the PIP window may be arbitrarily changed.

Figure 32:
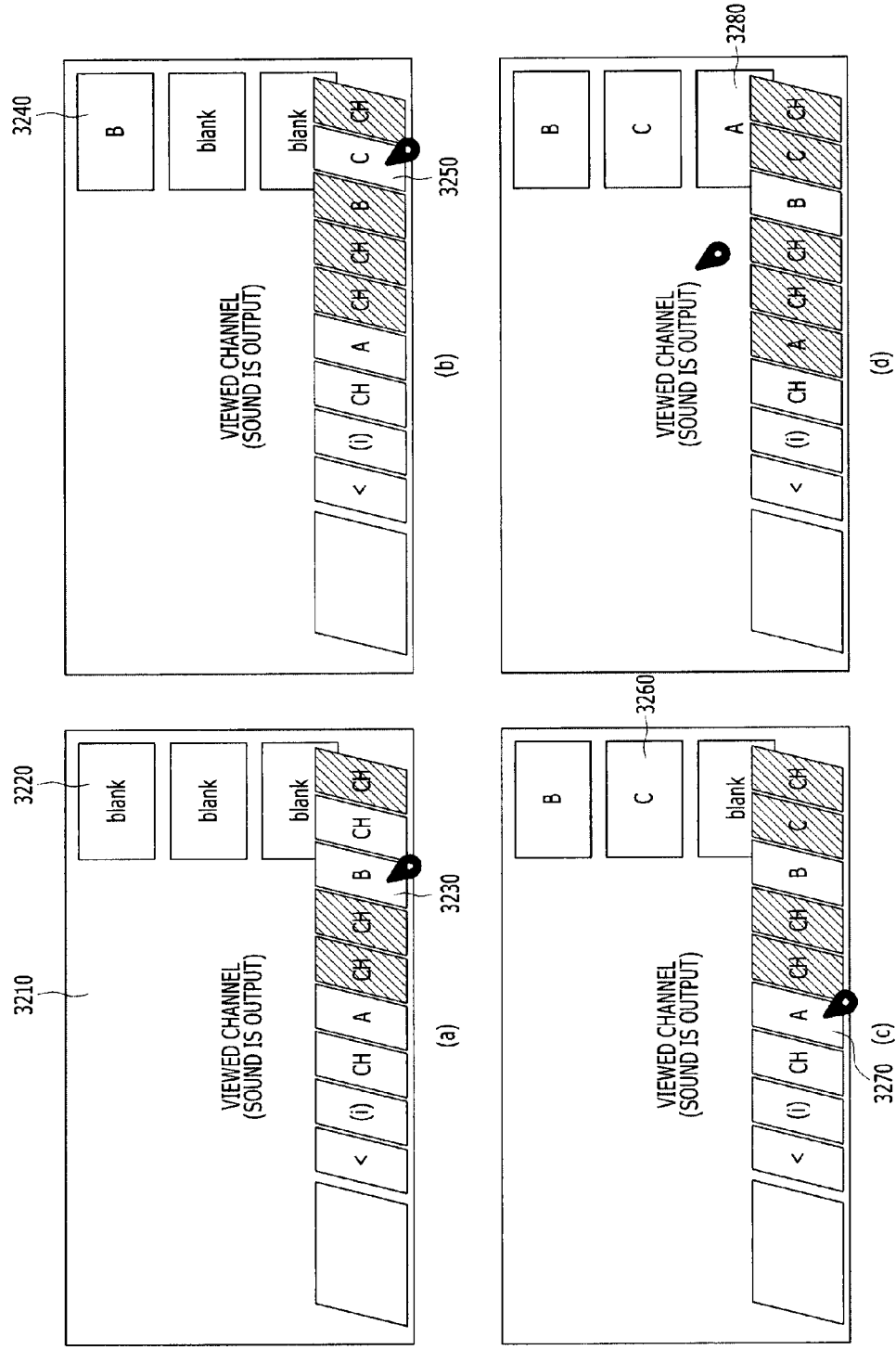
FIGS. 32 to 34 are views illustrating a third multi-view mode according to one embodiment of the present invention.
Figure 33:
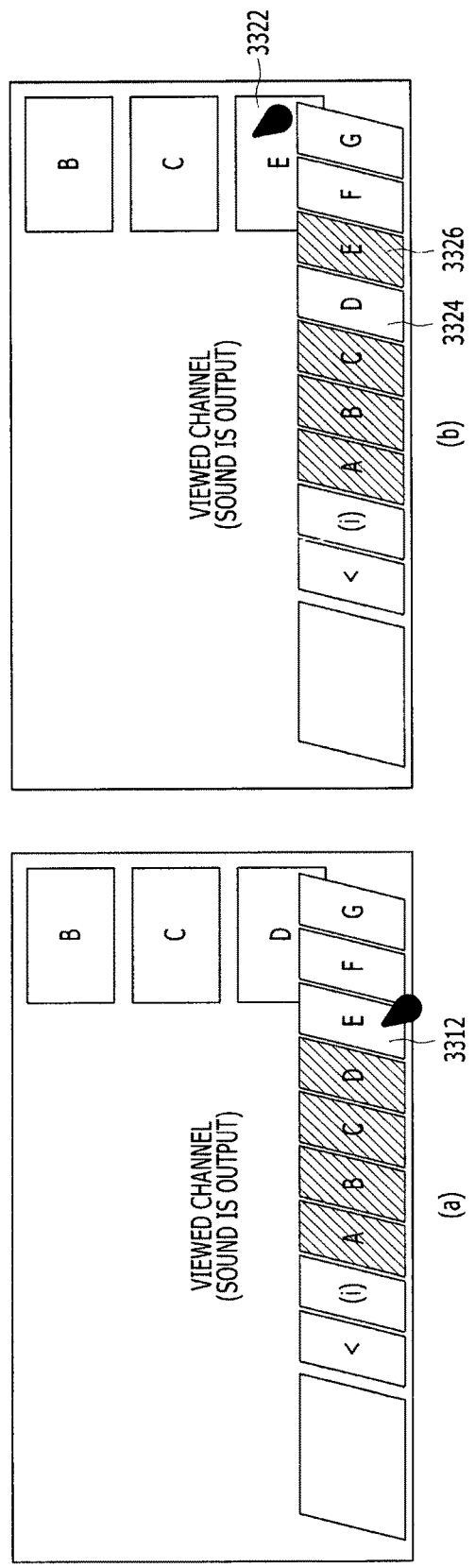
Figure 34:
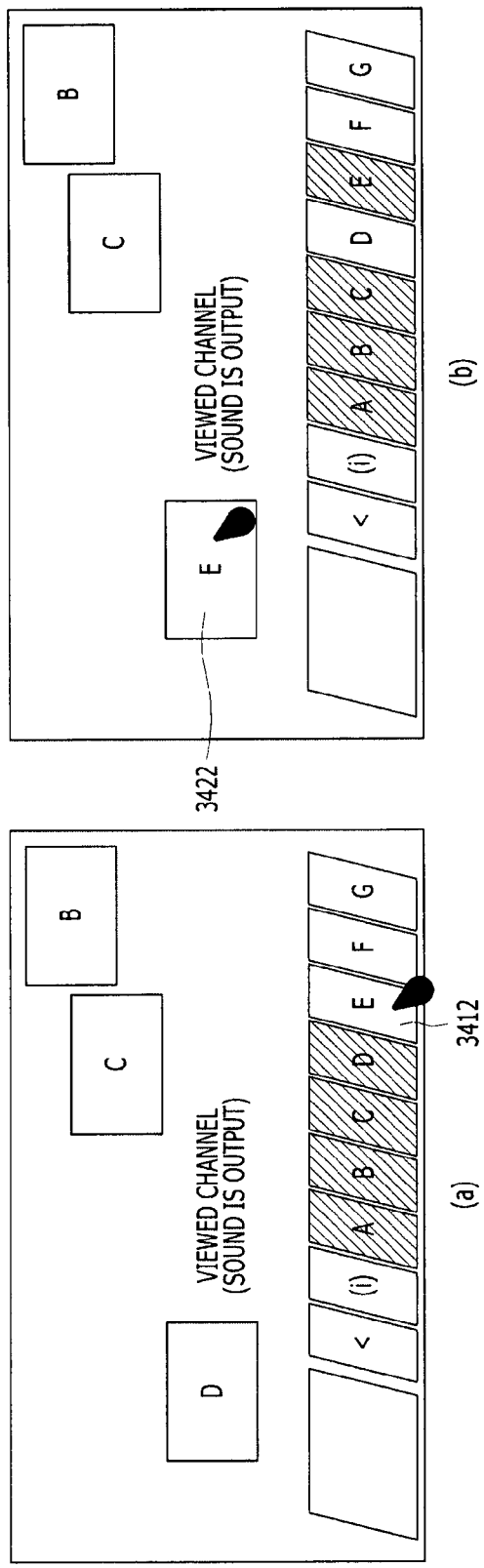

FIGS. 32 to 34 are views illustrating a third multi-view mode according to one embodiment of the present invention.

FIGS. 32a to 32d show operation of the third multi-view mode.

Referring to FIG. 32a, a first application execution screen is provided in a main area 3210, a menu launcher is provided at a lower side of the screen, and a third multi-view mode is accessed via the menu launcher.

In FIG. 32a, three windows are provided as multiple PIP windows, for convenience, and each window provides an initial screen of a third multi-view mode as a blank screen.

In FIG. 32a, when one menu item 3230 is selected from the menu launcher, an application execution screen corresponding to the selected menu item 3230 is provided in any one of multiple PIP windows. In FIG. 32b, for example, an embodiment in which the application execution screen is provided in a PIP window 3240 located at a highest side among three PIP windows is shown.

In FIG. 32b, when another menu item 3250 is selected from the menu launcher, the device may provide an application execution screen corresponding to the selected menu item 3250 in the second PIP window 3260 of the multiple PIP windows as shown in FIG. 32c.

When another menu item 3270 is selected from the menu launcher, as shown in FIG. 32d, an application execution screen corresponding to the selected menu item 3270 may be provided in the third PIP window 3280 of the multiple PIP windows.

FIG. 33 shows an embodiment of a processing method when an additional menu item selection signal, that is, an application execution request, is received via a menu launcher after mapping at least one application to all PIP windows configuring multiple PIP windows, as shown in FIG. 32d.

Referring to FIG. 33a, in a state in which three PIP windows respectively provide application execution screens B, C and D, when a signal for requesting execution of an application E is received from the menu launcher via the pointer, the device provides the execution screen of the application E via the third PIP window 3322 as shown in FIG. 33b. The PIP window may be any one of a PIP window for providing an application execution screen, execution of which is lastly requested, a PIP window having lowest priority among multiple PIP windows, a PIP window having a smallest PIP window size among the multiple PIP windows, a PIP window for providing an execution screen of an application having a different application type or attribute among the multiple PIP windows, a PIP window for providing a menu UI, and a PIP window for providing an application execution screen having a type or attribute equal to or different from that of the application of a newly selected menu item.

When multiple PIP windows are arranged as shown in FIG. 34a and an additional application execution request shown in FIG. 33a, that is, a signal for selecting an application menu item 3412, is received, the device may provide the execution screen of the application E corresponding to the menu item 3412 in the PIP window 3422, which is being output at a lowest side, among the multiple PIP windows, as shown in FIG. 34b.

When three PIP windows are provided as multiple PIP windows and three menu items are selected from the menu launcher, the selected menu items are sequentially provided in the three PIP windows, respectively. Thereafter, when one or more menu items are further selected from the menu launcher, the following processing may be performed.

For example, there is a method of continuously and newly generating and providing PIP windows on a screen by the number of selected menu items unless the third multi-view mode ends. At this time, the PIP windows may be additionally generated up to a maximum number of PIP windows which may be provided on the screen, based on the size or average size of the currently provided PIP window or the size of a default PIP window.

As another example, there is a method of fixing the number of PIP windows configuring three windows and sequentially changing already provided applications. After a first application is provided in a first PIP window, a second application is provided in a second PIP window and a third application is provided in a third PIP window, when a fourth application is selected, execution of the first application in the first PIP window is stopped and the fourth application is executed.

Figure 35:
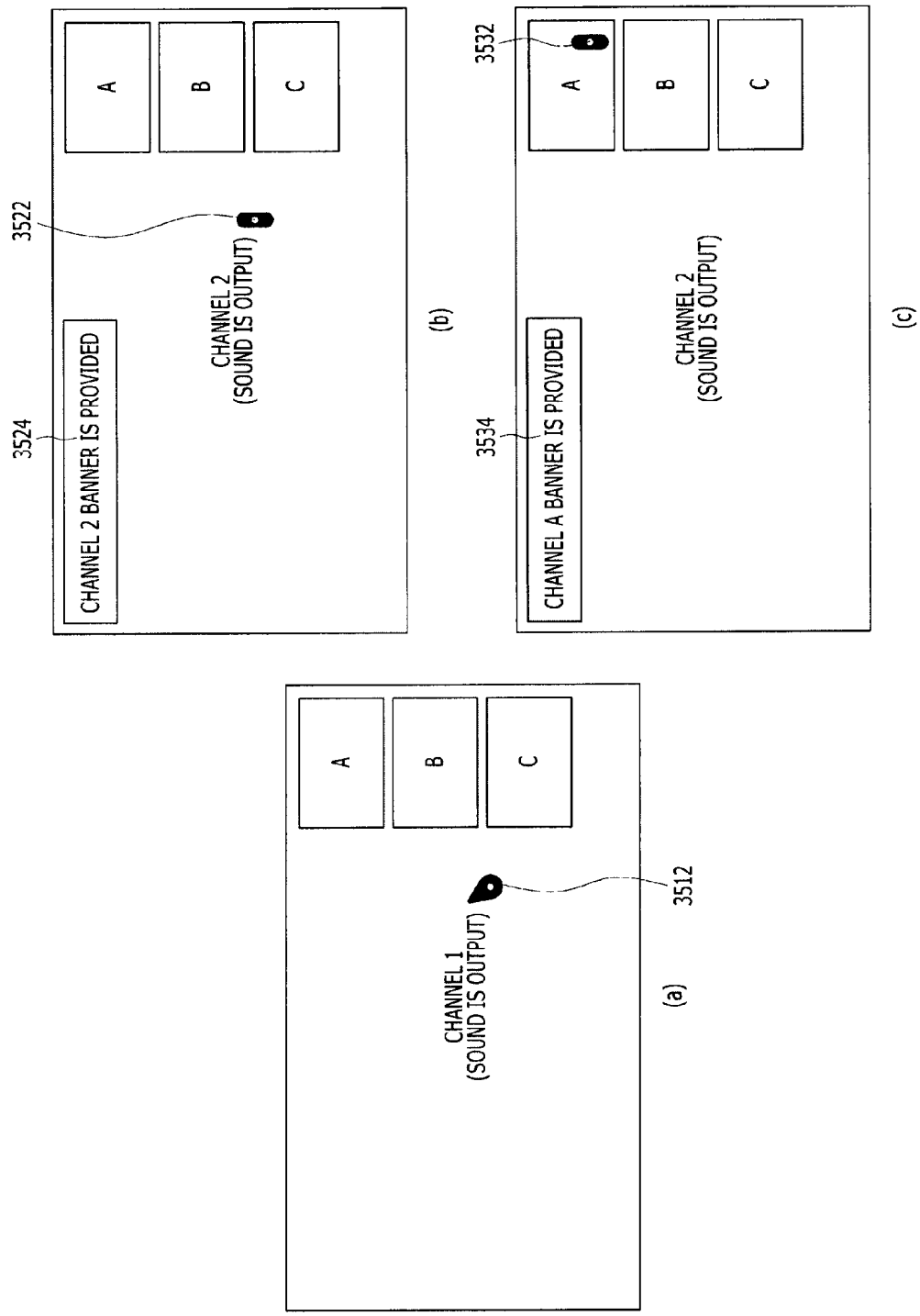
FIGS. 35 to 37 are views illustrating a third multi-view mode control method according to the present invention.
Figure 36:
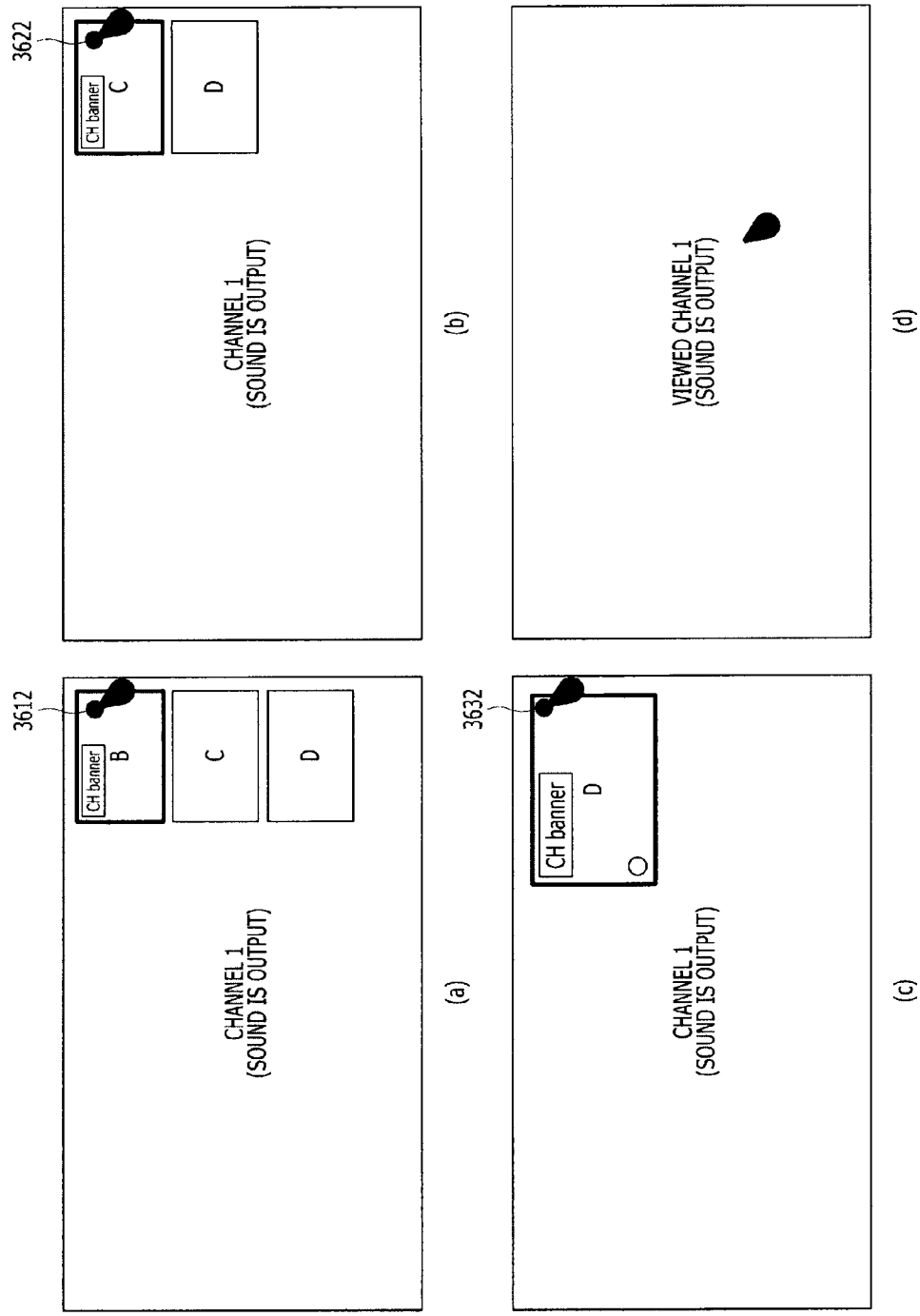
Figure 37:
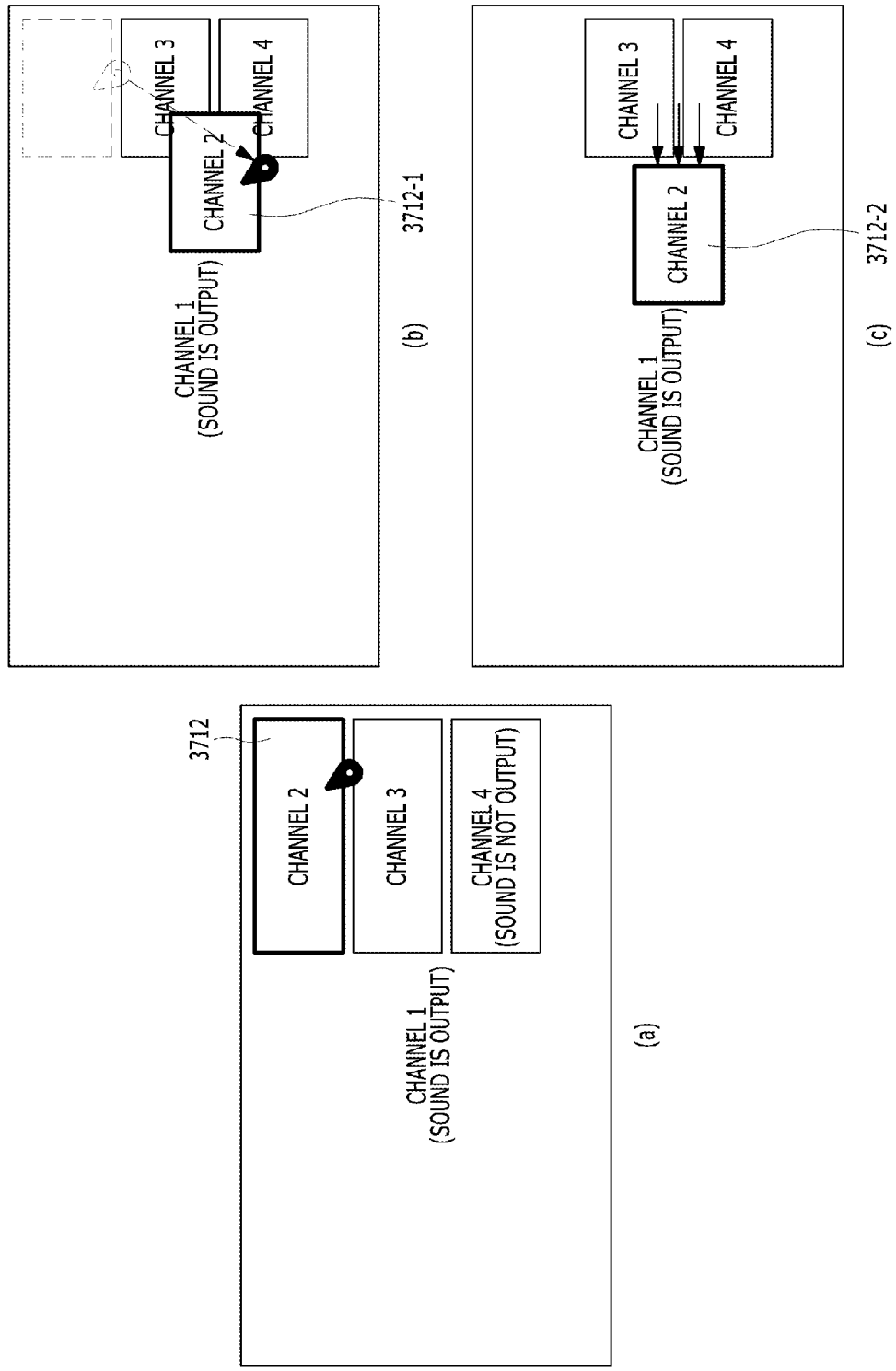

FIGS. 35 to 37 are views illustrating a third multi-view mode control method according to the present invention.

Referring to FIG. 35a, an execution screen of a first application is provided in a main area, an execution screen of an application A is provided in a first PIP window, an execution screen of an application B is provided in a second PIP window and an execution screen of an application C is provided in a third PIP window.

Here, FIG. 35 shows a method of directly controlling a main area and PIP windows using an input unit without using the menu item of the menu launcher.

As shown in FIG. 35a, when a signal corresponding to a first action is received in a state in which the pointer 3512 is located in the main area, as shown in FIG. 35b, the shape of the pointer changes and, when a second action is taken, the first application which is already provided in the main area is controlled according to the second action. Meanwhile, when the main area is controlled according to the second action, guide data such as a banner UI (3524) may be provided in a predetermined area of the screen. At this time, no operation may be performed in the multiple PIP windows according to the location of the pointer. That is, in FIG. 35b, the same application data as FIG. 35a may be processed in the multiple PIP windows.

Meanwhile, in FIG. 35a or 35b, when a first action is taken in a state in which the pointer is located in any PIP window 3532 of the multiple PIP windows, as shown in FIG. 35c, the shape of the pointer changes and control operation such as application change is performed according to a second action. At this time, guide data such as a banner UI 3534 may be provided in the predetermined area of the screen according to change operation of the PIP window. At this time, in FIG. 35c, no change may be made in the PIP windows other than the PIP window, in which the pointer is located, and the main area.

Fundamentally, a plurality of applications is simultaneously controlled on the screen on which the multiple windows are provided. In this case, when a request for changing a specific application is received, a menu may be provided or operation may be controlled such that the application provided according to the request for changing the specific application does not overlap an already provided application. For example, the application A and the application B are not controlled to be simultaneously executed in the PIP window for providing the execution screen of the application C via the control process.

Although not shown, the multiple windows may be automatically executed according to detailed information or a request for related information of the application which is being provided in the main area via the menu launcher or a separate route even when the second multi-view mode or the third multi-view mode is not directly requested.

FIG. 36 illustrates a control method such as window deletion in the third multi-view mode, for example.

In FIG. 36, when a signal for selecting any one of the multiple PIP windows is received, the digital device provides one or more functional icons for the PIP window. For example, in FIG. 36a, a provided functional icon 3612 may be a window deletion functional icon. Accordingly, when a signal for selecting the functional icon 3612 is received via the pointer, the digital device deletes the selected window from the screen such that only two PIP windows are left as shown in FIG. 36b.

In FIG. 36b, when another predetermined PIP window is selected and the functional icon 3622 is selected, the digital device may delete the PIP window and provide only one PIP window as shown in FIG. 36c.

In FIG. 36c, when another PIP window is selected and the functional icon is reselected, the digital device deletes the last PIP window and provides the screen shown in FIG. 36d. That is, in FIG. 36d, the multi-view mode ends.

Meanwhile, in FIGS. 36a to 36c, when the functional icons are selected, the digital device may output guide data such as a confirmation message on the screen in order to determine whether the user wants to delete the PIP window.

FIG. 37 illustrates an individual control method of each PIP window in a third multi-view mode.

Referring to FIG. 37a, in general, the multiple PIP windows are sequentially aligned and provided at the right side of the screen.

At this time, when a signal for moving one PIP window is received, control is performed as shown in FIG. 37b so as to move the window.

In FIG. 37b, fundamentally, the PIP window is moved to a requested area according to a user request. When predetermined data such as a menu or another PIP window banner UI is being output in the requested area, the PIP window may be moved to an arbitrary area near the requested area. Referring to FIG. 37c, when the first PIP window is moved to overlap the second PIP area and the third PIP area, the first PIP area is automatically moved to a non-overlap area 3712-2 and is provided as shown in FIG. 37c.

In the present specification, the action is used to include at least short-/long-click of a key button provided on the front panel of the digital device or the input unit, several clicks of the same key button, a gesture using the input unit or a user gesture, data sensed via a camera sensor or another sensor, and various inputs such as voice.

Although not separately described in the present specification, only one PIP window is provided in the second multi-view mode and a plurality of PIP windows is provided in the third multi-view mode. Accordingly, the size of each PIP window of the third multi-view mode may be less than that of the single PIP window provided in the second multi-view mode.

In addition, the quality of the area provided in the multi-view mode or the application provided in the PIP window may be different from that of the application provided in the main area. For example, whereas the main area provides a FHD or UHD application execution screen, the image quality of the PIP window or the area related to the multi-view mode is HD or SD, in consideration of a resource limit or power consumption of the digital device. The image quality of the PIP window or the area related to the multi-view mode may be separately controlled.

In the present specification, since the size or location of the PIP window or the area related to the multi-view mode may change, as described above, the window may be deleted by dragging and dropping the PIP window or the area related to the multi-view mode to any edge of the screen without the functional icon.

Although not shown, when the window is activated and movable as described above in a state in which the menu launcher is provided on the screen, the application which is being provided in the window may be automatically registered as a favorite application by moving the window between predetermined menu items of the menu launcher. In addition, when the window is located on a menu item which is already provided, additional operation may be performed. For example, when the window is located on a recording/scheduled recording menu item, immediate recording/scheduled recording of the application which is being output in the window may be performed. Alternatively, when the window is located on a web browser or a search function menu item, the web browser or the search browser may be executed using information on the application of the window to provide a search word or a search result. In addition, various operations may be performed. As described above, when additional operation is performed, a window provided therefor may be provided on the screen in an area or with a size different from that of the multiple windows.

Figure 38:
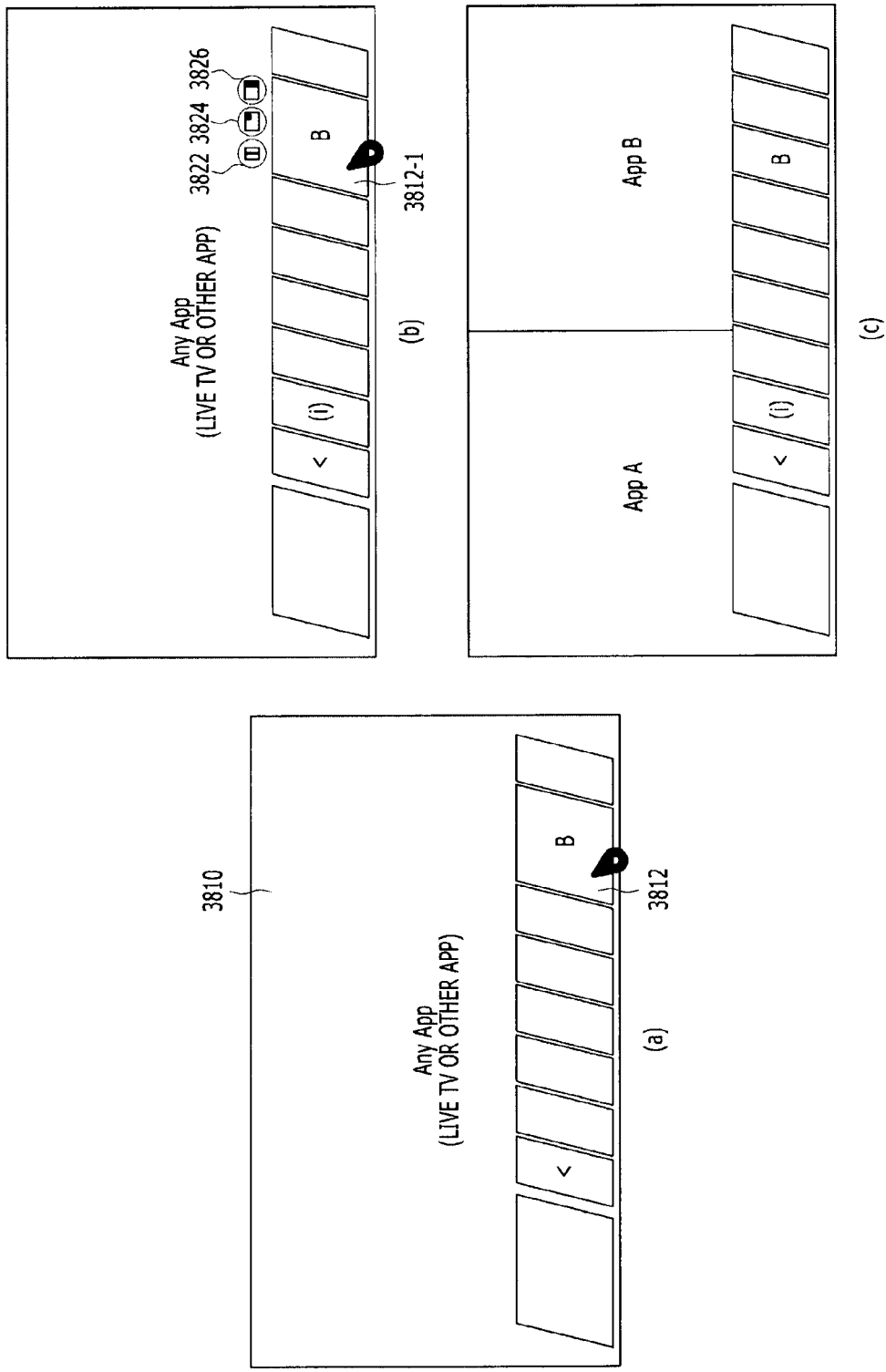
FIG. 38 is a view illustrating a multi-view mode entrance method according to another embodiment of the present invention.

FIG. 38 is a view illustrating a multi-view mode entrance method according to another embodiment of the present invention.

Referring to FIG. 38a, an application is being executed in a main area 3810 and a menu launcher is provided on the application execution screen. As described above, the menu launcher includes a recent part and an application part. In FIG. 38a, assume that an application B menu item 3812 listed in the application part is selected. Although a multi-view function menu item of the application part is selected to enter the multi-view mode in the above-described embodiments, in the present embodiment, any one of the applications listed in the application part is selected according to calling of the menu launcher without accessing the multi-view function menu item to enter the multi-view mode.

When the application B menu item 3812 is selected in FIG. 38a, the digital device provides multi-view mode icons 3822, 3824 and 3826 near the selected menu item as shown in FIG. 38b. The first multi-view mode icon 3822 is a functional icon for entering the first multi-view mode for dividing the screen into two areas, the second multi-view mode icon 3824 is a functional icon for entering the second multi-view mode including a single PIP and the third multi-view mode icon 3826 is a functional icon for entering the third multi-view mode including multiple PIPs. At this time, the size of the selected application B menu item 3812-1 may be greater than that of FIG. 38a.

When the first multi-view mode icon 3822 is selected in FIG. 38b, the digital device divides the screen into two areas as shown in FIG. 38c and provides the execution screen of the already provided application in the first area and provides the execution screen of the selected application B in the second area.

Although not shown, when the second multi-view mode icon 3824 or the third multi-view mode icon 3826 is selected in FIG. 38b, as shown in FIG. 38c, the screen may be configured to suit the multi-view mode to provide the application B execution screen.

Figure 39:
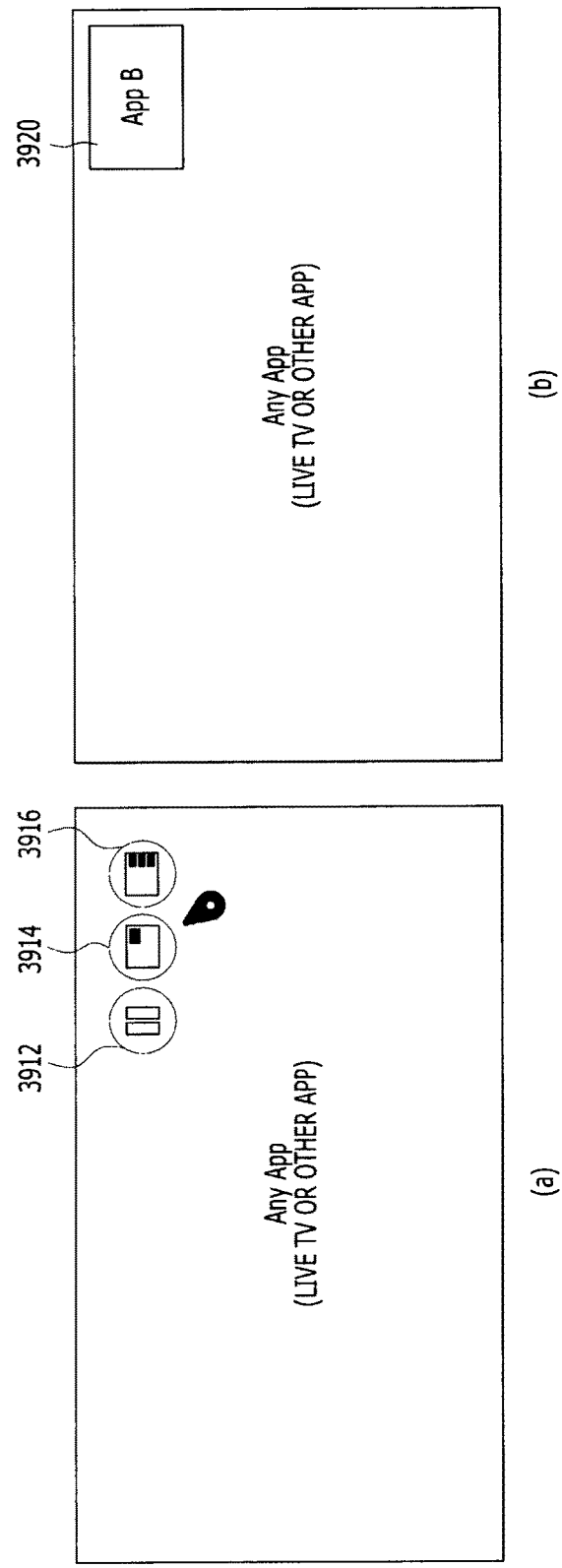
FIG. 39 is a view illustrating a multi-view mode entrance scenario without a menu launcher like FIG. 38.

FIG. 39 is a view illustrating a multi-view mode entrance scenario without a menu launcher like FIG. 38.

In FIG. 39a, one application is executed on a full screen. At this time, the digital device may output multi-view mode icons 3912, 3914 and 3916 in a predetermined area of the screen according to reception of a predetermined key button signal of the input unit. Each multi-view mode icon is a functional icon for entering the first to third multi-view modes. At this time, FIG. 39 illustrates a multi-view mode entrance scenario without a menu launcher unlike FIG. 38.

In FIG. 39a, for example, when a signal for selecting the second multi-view mode icon 3914 is received, the digital device may configure and provide the screen as shown in FIG. 39b. In this case, a blank screen or a predetermined application may be automatically executed and provided in the PIP window generated according to entrance into the second multi-view mode. The predetermined application may mean any one of a previously executed application, an application related to an application which is being provided on the full screen in FIG. 39a, a predetermined application, a favorite application, a recording/scheduled recording application, a web browser application, etc.

Figure 40:
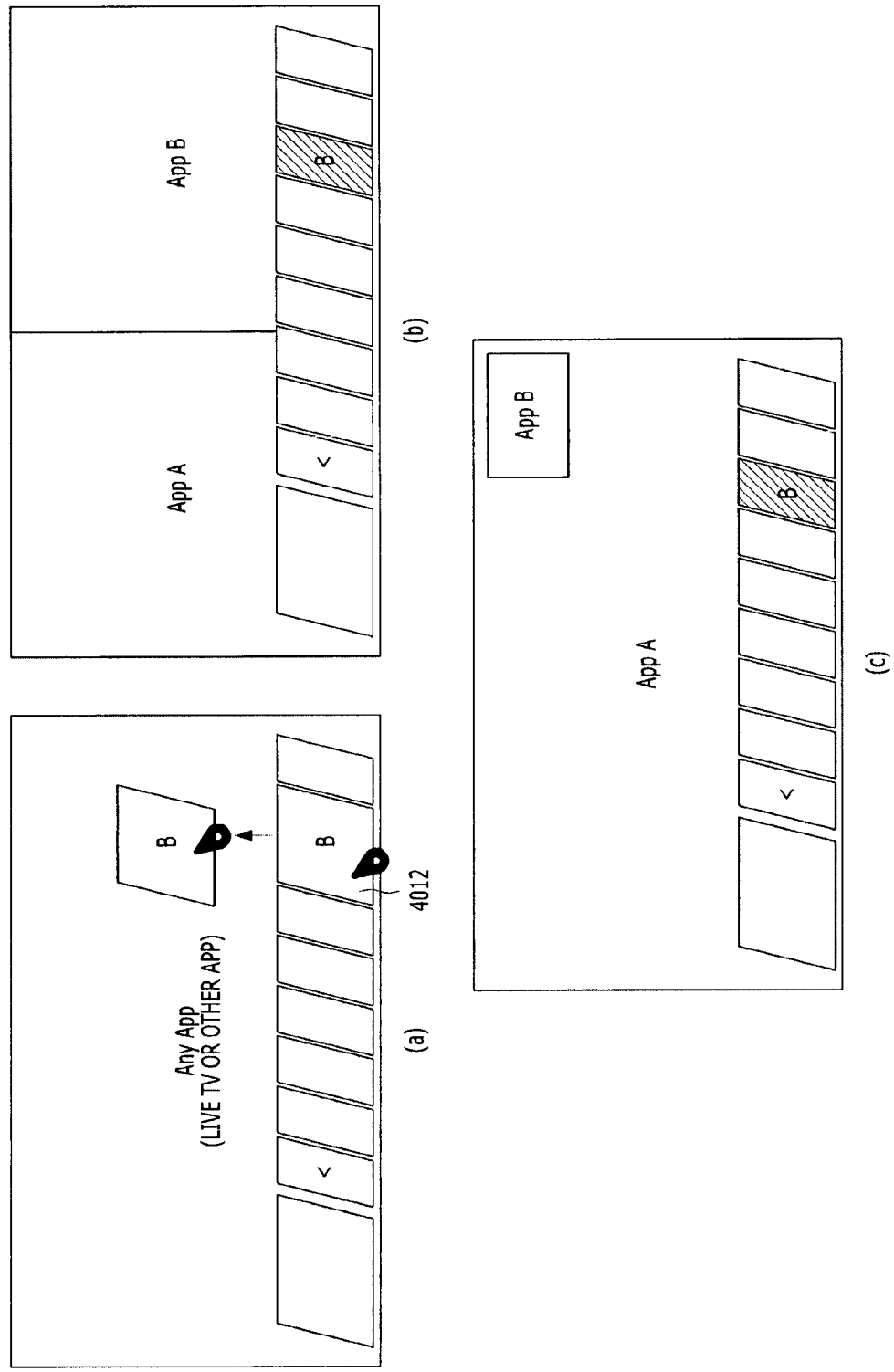
FIG. 40 is a view illustrating a multi-view mode entrance scenario different from that of FIG. 38.

FIG. 40 is a view illustrating a multi-view mode entrance scenario different from that of FIG. 38.

FIG. 40 illustrates a scenario of entering the multi-view mode using a method different from that of FIG. 38, although the menu launcher is used similarly to FIG. 38.

For example, in FIG. 40a, when the digital device selects a predetermined application menu item 4012 of an application part of a displayed menu launcher and drags and drops the predetermined application menu item in a predetermined area of the screen in which the application is being executed, as shown in FIG. 40b, the screen may be configured and provided in the first multi-view mode as shown in FIG. 40b or in the second multi-view mode as shown in FIG. 40c. At this time, in the state of FIG. 40b or 40c, when an additional application menu item is dragged and dropped in the predetermined area of the screen in addition to the application B menu item 4012 of FIG. 40a, the screen may enter the third multi-view mode in the state of FIG. 40b or 40c. Alternatively, in FIG. 40a, it is apparent that the screen may immediately enter the third multi-view mode according to drag and drop.

The states of FIGS. 40b and 40c may be determined according to the location of the dropped menu item on the screen or the application menu attribute, for example.

Figure 41:
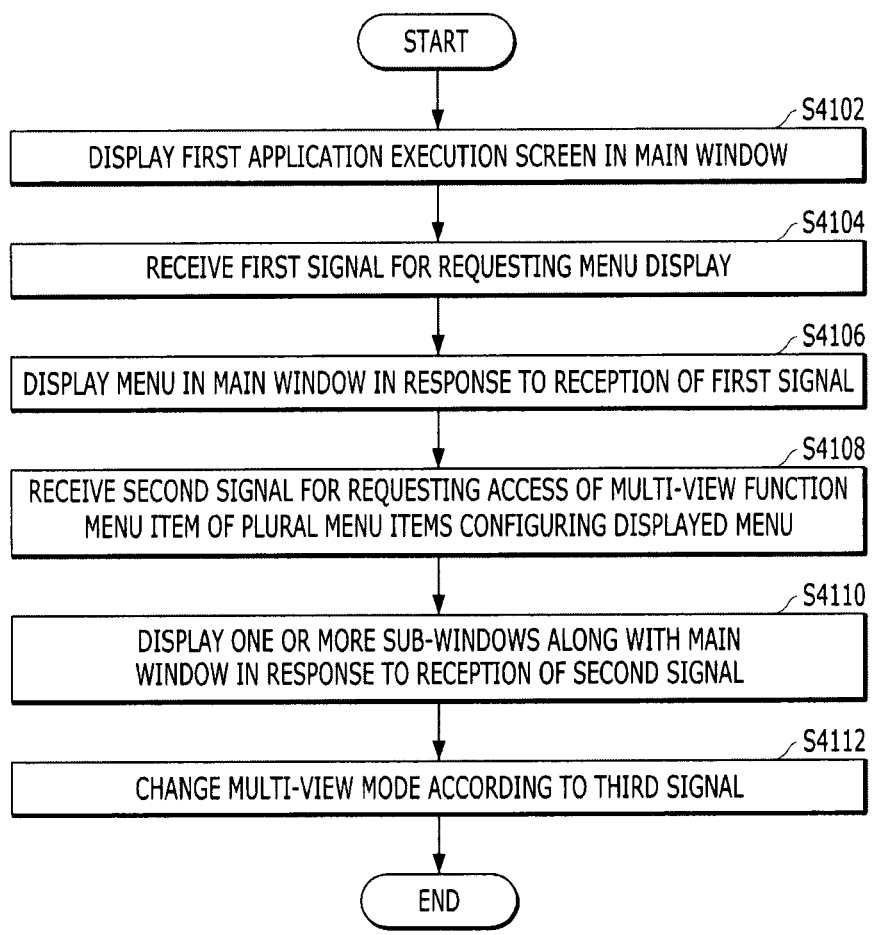
FIG. 41 is a flowchart illustrating a data processing method in a digital device according to one embodiment of the present invention.

FIG. 41 is a flowchart illustrating a data processing method in a digital device according to one embodiment of the present invention.

According to an embodiment of the present invention, a method of controlling a digital television, the method comprises displaying a first application being executed on a display screen of the digital television, receiving a first signal requesting a menu, displaying the requested menu, overlaid on the displayed first application, the requested menu including a plurality of menu items, receiving a second signal selecting a menu item among the plurality of menu items from the displayed menu, displaying a menu icon for a multi-view screen, receiving a third signal selecting the displayed menu icon, and displaying a second application corresponding to the selected menu item with the first application together in response to the third signal, on the display screen, wherein the multi-view screen is capable of displaying a plurality of applications together on the display screen.

The digital device displays a first application execution screen in a main window (S4102).

The digital device receives a first signal for requesting menu display (S4104) after displaying the first application execution screen in step S4102 and then displays a menu in the main window in response to reception of the first signal (S4106).

In step S4106, when the menu is displayed, the digital device configures the displayed menu using a plurality of menu items. When a second signal for requesting access of a multi-view function menu item among the plurality of menu items is received (S4108), one or more sub-windows are displayed along with the main window in response to reception of the second signal (S4110).

After step S4110, when a third signal is received, the digital device changes the multi-view mode related to the configuration of the screen including the main window and the one or more sub-windows (S4112). Here, the third signal may be received by at least one of the request for access of the multi-view function menu item after executing the multi-view mode, a request for access of the multi-view function menu item related key button provided on the front panel of the digital device and a request for access of the displayed one or more sub-windows.

The multi-view mode may include a first multi-view mode in which a screen is divided into two areas to provide a main window and a single sub-window, a second multi-view mode in which a first single sub-window is provided in the main window in the form of a PIP window and a third multi-view mode in which a plurality of sub-windows is provided in the main window in the form of a PIP window. The multi-view mode may sequentially change from the first multi-view mode to the third multi-view mode in response to reception of the third signal.

The size of the first window may change according to one or more windows provided in response to reception of the second or third signal.

In at least one of the second multi-view mode and the third multi-view mode, at least one of the size, location, sound output and quality of at least one sub-window may be arbitrarily controlled.

When the multi-view mode is executed, the digital device may reconfigure the displayed menu items in response to reception of the second signal. Alternatively, when the multi-view mode is executed, the digital device may process the menu items related to the multi-view mode among the displayed menu items from being distinguished from the menu items which are not related to the multi-view mode.

The digital device may identify the location of the pointer of the input unit and individually control an application which is being executed in a window belonging to the location of the pointer according to a user action at the identified location of the pointer of the input unit.

The digital device may control arrangement of the windows on the screen such that each sub-window is not prevented from overlapping a window for data which is being provided during execution or data to be provided after execution.

According to various embodiments of the present invention it is possible to enable a user to easily and conveniently use a desired function through minimum depths. In addition, it is possible to perform processing for intuitive identification and use convenience of a user on a primary menu so as to easily and conveniently use a desired application or function. In addition, it is possible to configure and provide a menu such that a user can intuitively recognize and utilize multi-view menu items for a plurality of applications and functions, thereby improving product satisfaction and raising purchasing desire.

A digital device having a Web OS installed therein and a method of processing a service or application in the digital device disclosed in this specification are not limited by the configurations and methods of the embodiments mentioned in the foregoing description. In addition, the embodiments mentioned in the foregoing description can be configured in a manner of being selectively combined with one another entirely or in part to enable various modifications.

In addition, the method of operating the digital device according to the present invention can be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include a carrier-wave type implementation such as transmission over the Internet. Furthermore, as the processor-readable recording medium is distributed to a computer system connected via a network, processor-readable code can be saved and executed in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit of the present invention.

What is claimed is:

1. A method of controlling a digital television, the method comprising:
   displaying a first application being executed on a display screen of the digital television;
   receiving, via a controller, a first signal requesting a menu;
   displaying, via the controller, the requested menu, overlaid on the displayed first application, the requested menu including a plurality of menu items;
   receiving, via the controller, a second signal selecting a menu item among the plurality of menu items from the displayed menu;
   displaying, via the controller, a menu icon for a multi-view screen after the receiving the second signal;
   receiving, via the controller, a third signal selecting the displayed menu icon; and
   displaying, via the controller, a second application corresponding to the selected menu item with the first application together in response to the third signal, overlaid on the display screen,
   wherein the multi-view screen is capable of displaying a plurality of applications together on the display screen,
   wherein the menu includes a first menu displayed in a first area of the display screen, the first menu corresponding to previously executed applications, and a second menu displayed in a second area of the display screen, the second menu corresponding to applications executable in the digital television, and
   wherein, when the menu item is selected, the size of the selected menu item is magnified, and the menu icon for a multi-view screen is displayed in the vicinity of the magnified menu item.

2. The method of claim 1, wherein the first application and the second application include at least one of a television application capable of providing a broadcast program and an electronic program guide (EPG), a web service application, a game application, or an external input application.

3. The method of claim 1, wherein the first application and the second application are provided by a streaming service, or are stored in an internal memory or an external memory.

4. The method of claim 1, wherein each screen of the multi-view screen is respectively controlled.

5. The method of claim 1, wherein the multi-view screen is provided based on a picture by picture (PBP), or one or more picture in picture (PIP) windows.

6. The method of claim 1, wherein locations of screens of the multi-view screen are interchanged with each other.

7. The method of claim 5, wherein a location of each of one or more PIP windows for the multi-view screen is changed in the display screen.

8. The method of claim 1 further comprises displaying one or more sub-menu items around the selected menu item in response to the received second signal.

9. The method of claim 8, wherein the one or more sub-menu items are provided as a function icon.

10. The method of claim 8, wherein a sub-menu item among the one or more sub-menu items is capable of interchanging the second application with a third application.

11. A digital television comprising:
   a display;
   an interface capable of receiving a first signal, a second signal, and a third signal; and
   a controller capable of controlling to:
   display a first application being executed on a display screen of the digital television,
   display a menu, overlaid on the displayed first application, including a plurality of menu items in response to the first signal requesting the menu,
   display a menu icon for a multi-view screen after receiving the second signal selecting a menu item among the plurality of menu items from the displayed menu, and
   display a second application corresponding to the selected menu item with the first application in response to the third signal, overlaid on the display screen after receiving a third signal selecting the displayed menu icon,
   wherein the multi-view screen is capable of displaying a plurality of applications together on the display screen,
   wherein the menu includes a first menu displayed in a first area of the display screen, the first menu corresponding to previously executed applications, and a second menu displayed in a second area of the display screen, the second menu corresponding to applications executable in the digital television, and
   wherein, when the menu item is selected, the size of the selected menu item is magnified, and the menu icon for a multi-view screen is displayed in the vicinity of the magnified menu item.

12. The digital television of claim 11, wherein the first application and the second application include at least one of a television application capable of providing a broadcast program and an electronic program guide (EPG), a web service application, a game application, or an external input application.

13. The digital television of claim 11, wherein the first application and the second application are provided by a streaming service, stored in an internal memory or stored in an external memory.

14. The digital television of claim 11, wherein the controller is capable of controlling screens of the multi-view screen.

15. The digital television of claim 11, wherein the controller is capable of controlling the multi-view screen to provide based on a picture by picture (PBP), or one or more picture in picture (PIP) windows.

16. The digital television of claim 11, wherein the controller is capable of controlling locations of screens of the multi-view screen to interchange with each other.

17. The digital television of claim 15, wherein the controller is capable of controlling a location of each of one or more PIP windows for the multi-view screen to change in the display screen.

18. The digital television of claim 11, wherein the controller is capable of controlling to display one or more sub-menu items around the selected menu item in response to the received second signal.

19. The digital television of claim 18, wherein the controller is capable of controlling the one or more sub-menu items to be provided as a function icon.

20. The digital television of claim 18, wherein the controller is capable of controlling interchanging the second application with a third application in response to selecting a sub-menu item among the one or more sub-menu items.

* * * * *